(12) United States Patent
Arao et al.

(10) Patent No.: US 9,110,248 B2
(45) Date of Patent: Aug. 18, 2015

(54) CONNECTOR ASSEMBLY

(71) Applicants: Hajime Arao, Yokohama (JP); Toshihisa Yokochi, Yokohama (JP); Itaru Sakabe, Yokohama (JP)

(72) Inventors: Hajime Arao, Yokohama (JP); Toshihisa Yokochi, Yokohama (JP); Itaru Sakabe, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 84 days.

(21) Appl. No.: 13/627,200

(22) Filed: Sep. 26, 2012

(65) Prior Publication Data

US 2013/0094818 A1 Apr. 18, 2013

Related U.S. Application Data

(60) Provisional application No. 61/548,324, filed on Oct. 18, 2011.

(30) Foreign Application Priority Data

Sep. 30, 2011 (JP) ................. 2011-217774
Sep. 7, 2012 (JP) ................. 2012-197585

(51) Int. Cl.
*G02B 6/36* (2006.01)
*G02B 6/42* (2006.01)
*G02B 6/38* (2006.01)
*G02B 6/44* (2006.01)

(52) U.S. Cl.
CPC ............ *G02B 6/3608* (2013.01); *G02B 6/4268* (2013.01); *G02B 6/3887* (2013.01); *G02B 6/4272* (2013.01); *G02B 6/4284* (2013.01); *G02B 6/4488* (2013.01)

(58) Field of Classification Search
CPC ............ G02B 6/42; G02B 6/48; H01S 5/022; H01L 33/48; H01L 31/0232
USPC .......................................................... 385/92
See application file for complete search history.

(56) References Cited

U.S. PATENT DOCUMENTS 6,028,975 A 2/2000 Davidson
2003/0223697 A1 12/2003 Simon

FOREIGN PATENT DOCUMENTS

| CN | 102124383 | 7/2011 | |
|---|---|---|---|
| JP | S60-159411 | 10/1985 | |
| JP | 2004-087613 | 3/2004 | |
| JP | 2006-064836 | 3/2006 | |
| JP | 2010-276853 | 12/2010 | |
| JP | 2011-112898 | 6/2011 | |
| JP | 2011112898 | * 6/2011 | ............... G02B 6/42 |

* cited by examiner

Primary Examiner — Mike Stahl
Assistant Examiner — Kajli Prince
(74) Attorney, Agent, or Firm — Drinker Biddle & Reath LLP

(57) ABSTRACT

A connector assembly capable of efficiently dissipating heat is provided. The connector assembly includes: an optical cable; and a connector module, and the optical cable includes an optical fiber core wire, an outer cover provided around the optical fiber core wire, and a metallic braid provided between the optical fiber core wire and the outer cover, and the connector module includes a housing defining a space, and a circuit board received in the space of the housing and mounted with a photoelectric conversion unit connected with the optical fiber core wire, and the metallic braid of the optical cable and the circuit board of the connector module are thermally connected to each other.

9 Claims, 22 Drawing Sheets

CONNECTOR ASSEMBLY

This application claims the benefit of U.S. Provisional Application No. 61/548,324, filed Oct. 18, 2011, which is incorporated by reference herein in its entirety.

BACKGROUND OF THE INVENTION

1. Field of the Invention

The present invention relates to a connector assembly.

2. Related Background Art

As a connector assembly in the related art, a connector assembly that converts an electrical signal into an optical signal has been known. For example, a connector assembly disclosed in Japanese Patent Application Laid-Open No. 2011-112898 includes an optical cable and a photoelectric conversion module. The photoelectric conversion module includes a circuit board on which a photoelectric conversion unit connected with an optical fiber of the optical cable is mounted, a housing receiving the circuit board, and an electrical connector connected with the circuit board. In the connector assembly, electrical signals which are input and outputted are converted into the optical signals by the photoelectric conversion unit and signal transmission by the optical signal is performed.

SUMMARY OF THE INVENTION

In the connector assembly, heat is generated from a controlling IC or the photoelectric conversion unit mounted on the circuit board. Since the heat may influence breakage of the housing or the circuit board, or a transmission characteristic, the heat needs be dissipated to the outside. As a heat dissipation destination, electronic apparatuses including a personal computer, and the like connected with the connector assembly are considered. However, the heat dissipation to the electronic apparatus depends on a state thereof, and for example, when the temperature of the electronic apparatus increases, the heat of the connector assembly is not sufficiently dissipated to the electronic apparatus. Meanwhile, the heat may be dissipated through the housing of the connector module, but since the housing becomes hot, a user may get a feeling of strangeness.

The present invention has been accomplished in order to solve the problem as described above, and it is an object of the present invention to provide a connector assembly that can efficiently dissipate heat.

In order to solve the above problem, a connector assembly according to the present invention is a connector assembly that includes: an optical cable; and a connector module, wherein the optical cable includes an optical fiber, an outer cover provided around the optical fiber, and a metallic heat transfer member provided between the optical fiber and the outer cover, and the connector module includes a housing defining a space, and a circuit board received in the space of the housing and mounted with a photoelectric conversion unit connected with the optical fiber, and the heat transfer member of the optical cable and the circuit board of the connector module are thermally connected to each other by a thermal conductor.

In the connector assembly, the metallic heat transfer member is provided in the optical cable, and the circuit board on which a heating element such as the photoelectric conversion unit is mounted and the heat transfer member are thermally connected to each other. By this configuration, heat generated from the photoelectric conversion unit is transferred to the heat transfer member of the optical cable through the circuit board, and dissipated outside from the outer cover of the optical cable. That is, in the connector assembly, a route for dissipating heat is established between the connector module and the optical cable, and thus heat is transferred to the optical cable, and as a result, the heat of the circuit board may be efficiently radiated to the optical cable. As a result, since the housing does not have excessive heat in the connector assembly, a feeling of strangeness to a user may be reduced. Further, in the connector assembly, heat may be sufficiently radiated without depending on a state of a connection destination of the connector assembly. As described above, in the connection assembly, heat may be efficiently dissipated.

According to an embodiment, the heat transfer member of the optical cable and the circuit board of the connector module are thermally connected to each other by a thermal conductor. In this case, since the heat of the housing may be efficiently radiated to the optical cable by the thermal conductor, the heat of the circuit board may be efficiently radiated to the optical cable.

According to an embodiment, thermal conductivity of the heat transfer member may be higher than that of the thermal conductor. In this case, since the heat of the housing may be efficiently radiated to the optical cable, the heat of the circuit board may be efficiently radiated to the optical cable.

According to the embodiment, the photoelectric conversion unit includes a controlling semiconductor and a light receiving/emitting element, the thermal conductor includes the housing thermally connected with the circuit board through a connection member, an electrical connector electrically connected with the circuit board is provided at a front end of the housing, the controlling semiconductor is positioned in front of the light receiving/emitting element and in the rear of the electrical connector on the circuit board, and has a larger amount of heat generation than the light receiving/emitting element, and the connection member includes a region where the circuit board and the housing are thermally connected to each other, in front of the light receiving/emitting element. By this configuration, the heat of the circuit board may be radiated to the optical cable while preventing heat from a heat source (for example, an electronic apparatus connected with the controlling semiconductor or the electrical connector) having the larger amount of heat generation than the light receiving/emitting element from flowing into the light receiving/emitting element.

According to the embodiment, the heat transfer member is clamped to a metallic clamping member attached to a terminal of the optical cable, and the clamping member is thermally connected with the housing, and the thermal conductor is configured by the clamping member and the housing. As such, in the connector assembly, the optical cable is clamped by the clamping member to improve workability for attaching the optical cable to the clamping member. Further, in the connector assembly, since the thermal conductor is configured by the clamping member and the housing, and the heat transfer member is clamped to the clamping member, heat may be efficiently transferred to the heat transfer member and heat may be efficiently dissipated.

According to the embodiment, the clamping member includes a cylinder portion into which the optical fiber is inserted, a base portion that flares outside a diameter direction of the cylinder portion, and a clamping portion positioned outside the diameter direction of the cylinder portion and clamping the terminal of the optical cable through sandwiching with the cylinder portion, and the heat transfer member is arranged on an outer peripheral surface of the cylinder portion, and engaged and clamped between the outer peripheral surface and the clamping portion. By this configuration, in the connector assembly, the optical cable may be excellently held.

According to the embodiment, the heat transfer member is bent to an outer periphery of the outer cover at the terminal of the optical cable, and in the clamping member, the heat transfer member abuts the outer peripheral surface of the cylinder portion, the base portion, and the clamping portion. As such, in the connector assembly, the thermal conductor abuts the clamping member at a lot of spots, and as a result, the clamping member and the heat transfer member may be thermally connected with each other more excellently and a heat dissipation route may be excellently formed between the housing and the thermal conductor. Accordingly, heat may be efficiently dissipated.

According to the embodiment, the housing includes a first housing made of a metallic material, and the first housing configures the thermal conductor. As such, in the connector assembly, the housing is made of the metallic material, and as a result, the housing may serve as the thermal conductor and the heat of the circuit board may be excellently transferred to the heat transfer member of the optical cable.

According to the embodiment, the first housing includes a receiving member defining the space, and a fixing member configured to be connectable with the receiving member and holding the optical cable, and the heat transfer member is thermally connected to the fixing member, and the receiving member and the fixing member are thermally connected with each other. By this configuration, in the connector assembly, a radiation route of heat may be excellently established.

According to the embodiment, the connector module includes a connection member thermally connecting the circuit board and the receiving member of the first housing, and the connection member and the first housing configure the thermal conductor. As such, in the connector assembly, a route to transfer heat may be significantly established between the circuit board and the first housing by the connection member.

According to the embodiment, the first housing includes a receiving member defining the space, and a fixing member configured to be connectable with the receiving member and holding the optical cable, and the heat transfer member is thermally connected to the fixing member, and the fixing member is directly connected to the circuit board. As such, in the connector assembly, the fixing member is directly connected to the circuit board to significantly establish a route to transfer heat from the circuit board to the heat transfer member of the optical cable.

According to the embodiment, the housing includes a second housing made of a resin material, and the first housing is received the second housing. By this configuration, in the connector assembly, a heat transfer route for radiating heat to the optical cable side may be significantly configured. Further, since the second housing is made of the resin material, when a user touches the housing, the user less feels heat (hotness).

According to the embodiment, the heat transfer member is a metallic braid. In the connector assembly, by using the metallic braid, since density and a surface area may be ensured, an excellent heat transfer characteristic and heat dissipation characteristic may be acquired. Further, since the metallic braid has deformation to bending of the optical cable, a predetermined heat dissipation characteristic may be acquired even when the optical cable is bent.

According to the embodiment, the optical cable includes a tensile strength fiber between the optical fiber and the heat transfer member. In the connector assembly, by providing the tensile strength fiber, durability against external force such as tensile force, and the like applied to the optical cable may be ensured in the optical cable. Meanwhile, in the connector assembly, since the tensile strength fiber is provided between the optical fiber and the heat transfer member, it is possible to prevent dissipation of the generated heat to the outside from the heat transfer member through the outer cover from being interfered.

According to the embodiment, in the optical cable, a tube is provided between the tensile strength fiber and the metallic braid. As a result, in the connector assembly, it is possible to suppress heat from being transferred inside the optical cable and to excellently dissipate heat outside through the outer cover.

According to the embodiment, the heat transfer member is joined to the thermal conductor by soldering. In the connector assembly, since the heat transfer member and the thermal conductor are joined to each other by soldering, excellent thermal conductivity may be acquired.

According to the embodiment, the heat transfer member of the optical cable may be physically and thermally connected to the circuit board of the connector module. As such, in the connector assembly, the heat transfer member may be directly connected to the circuit board to transfer heat more efficiently.

According to the embodiment, the heat transfer member may be joined to the circuit board among a plurality of heating elements mounted on the same surface side of the circuit board. As a result, in the connector assembly, heat generated from the plurality of heating elements may be efficiently transferred to the heat transfer member.

According to the embodiment, the heat transfer member may be joined to the circuit board on a rear surface of the heating element mounted on one surface of the circuit board. As a result, in the connector assembly, on the same surface as the heating element, even when it is difficult to arrange the heat transfer member close to the heating element, heat may be efficiently conducted to the heat transfer member from a rear surface of a part on which the heating element is mounted, which corresponds to the circuit board.

According to the embodiment, the heat transfer may be divided and joined to the circuit board on both the surface and the rear surface of the circuit board. As a result, in the connector assembly, heat generated from the heating element may be efficiently conducted to the heat transfer member, from a plurality of spots on the circuit board.

According to the present invention, the heat can be efficiently dissipated.

DESCRIPTION OF THE PREFERRED EMBODIMENTS

First Embodiment

The preferred embodiments of the present invention will be described below with reference to the accompanying drawings. In the below description, the same elements or elements with the same functionality will be denoted by the same reference signs, without redundant description.

Figure 1:
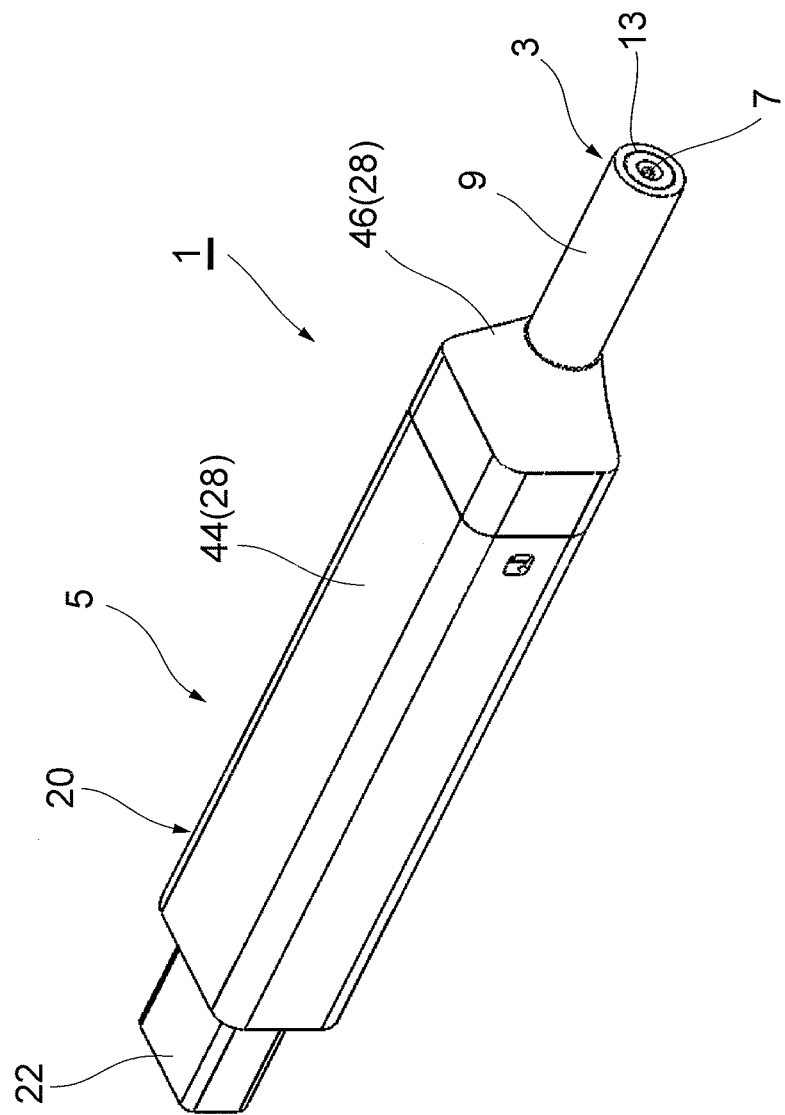
FIG. 1 is a perspective view illustrating a connector assembly according to a first embodiment.
Figure 2:
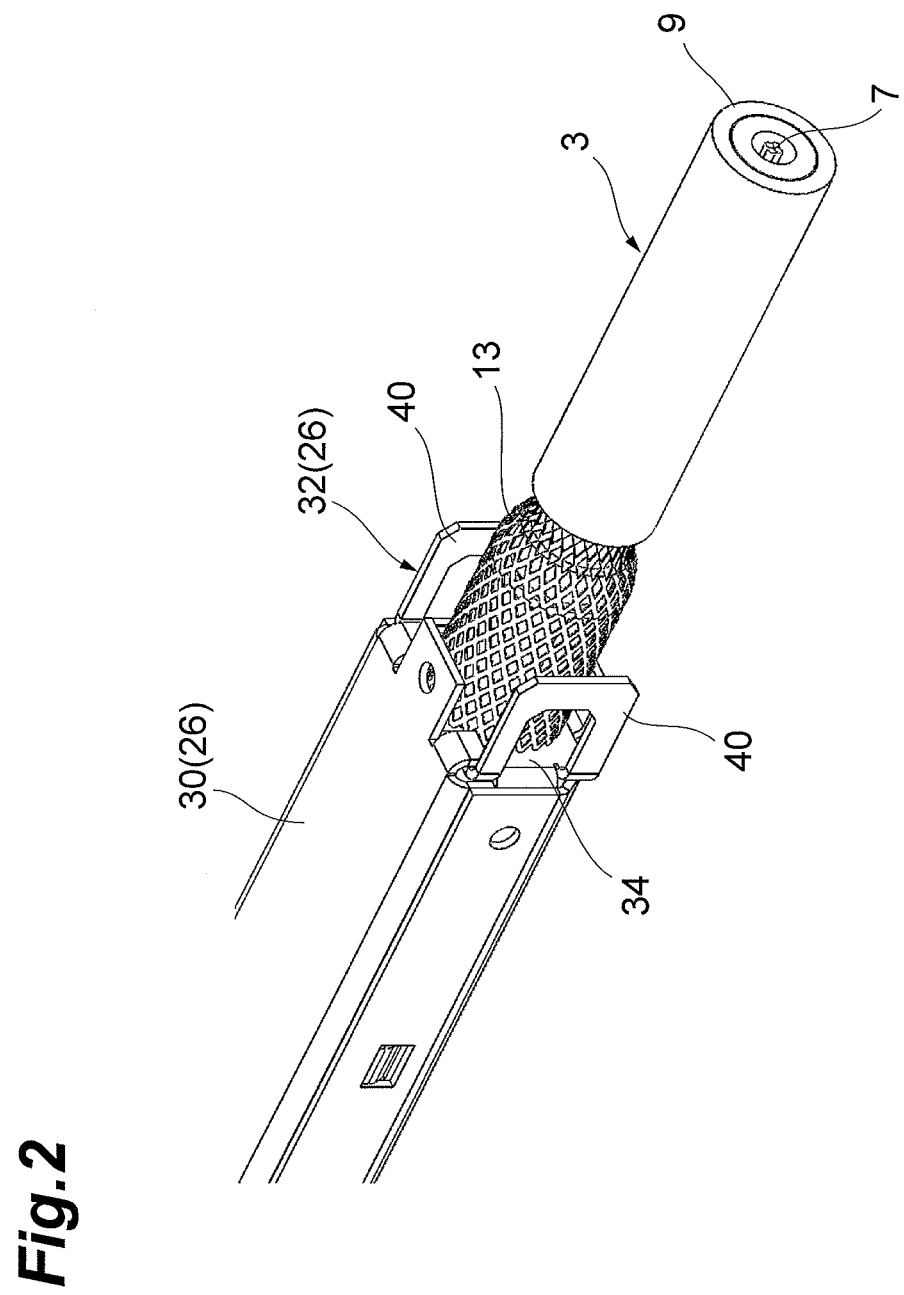
FIG. 2 is a perspective view illustrating a state in which a resin housing is removed.
Figure 3:
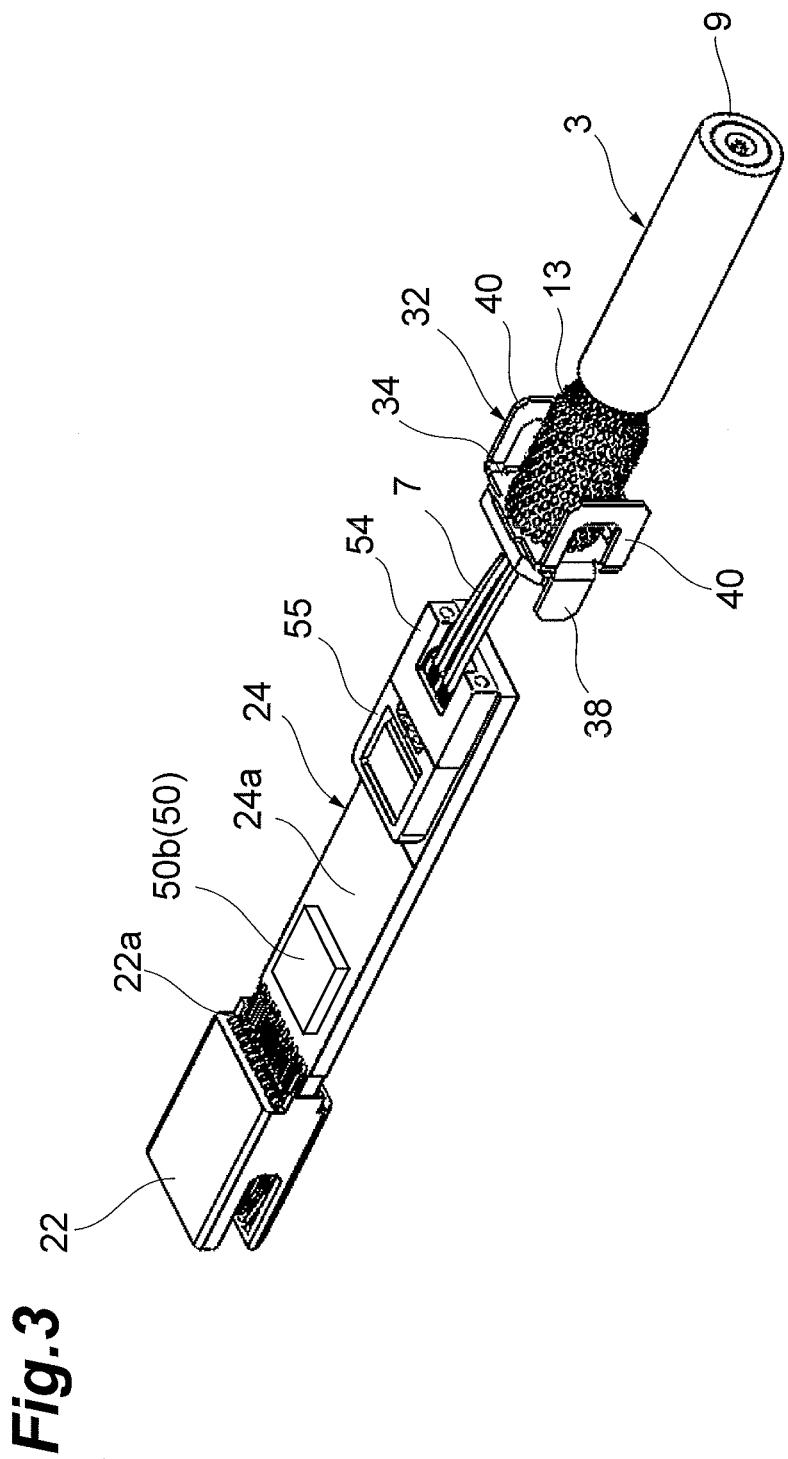
FIG. 3 is a perspective view illustrating a state in which a housing is removed.
Figure 4A:
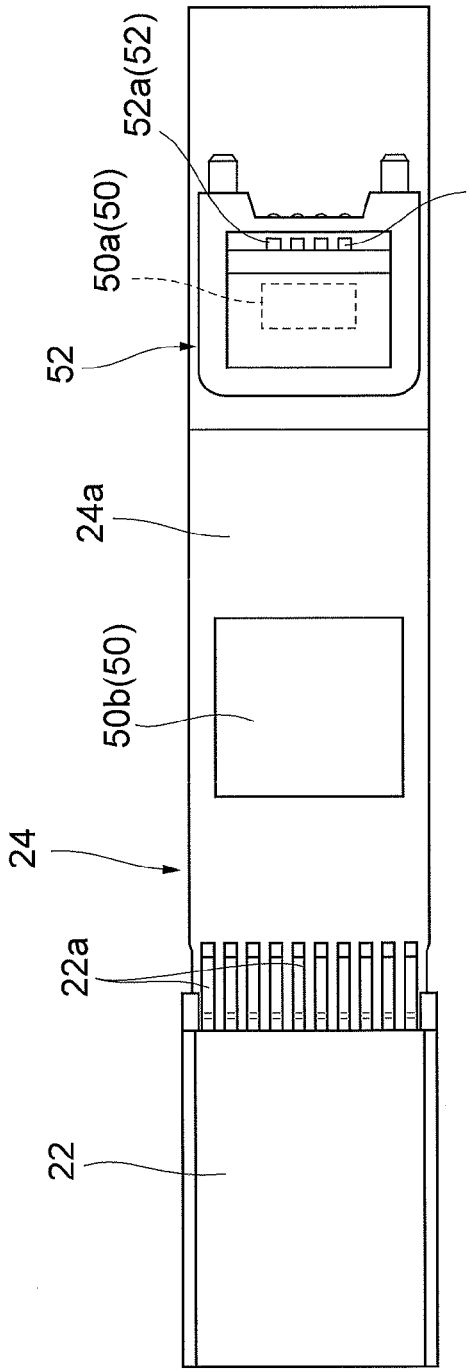
FIG. 4A is a diagram of a circuit board illustrated in FIG. 3 from the top view and FIG. 4B is a diagram of the circuit board illustrated in FIG. 3 from the side view.
Figure 4B:
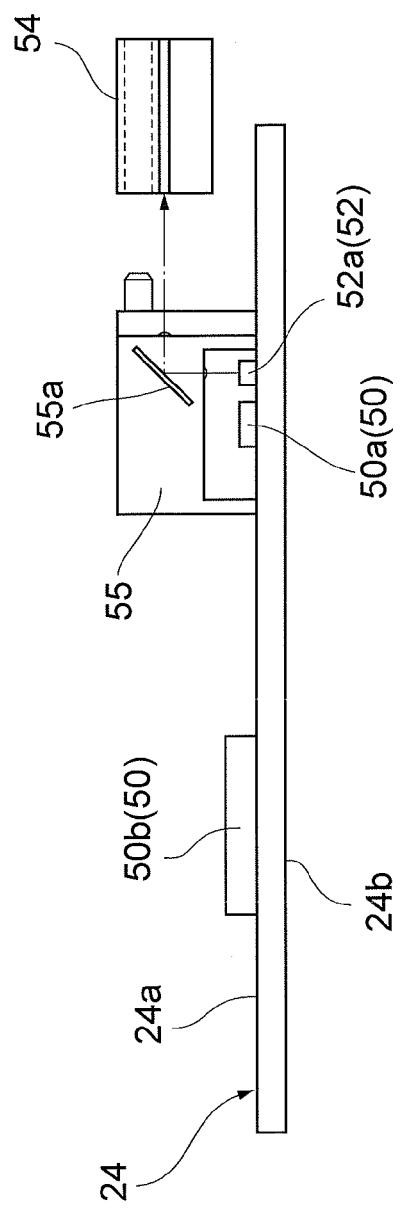
Figure 5:
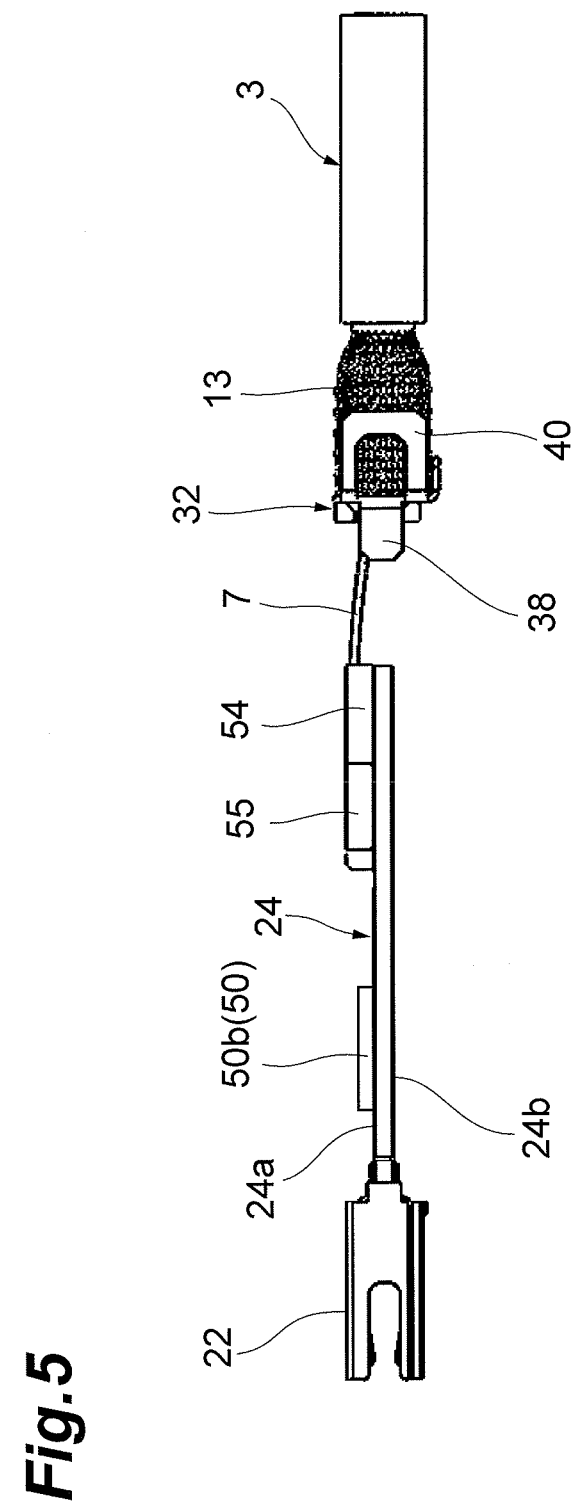
FIG. 5 is a diagram of the circuit board and a fixing member illustrated in FIG. 3 from the side view.
Figure 6:
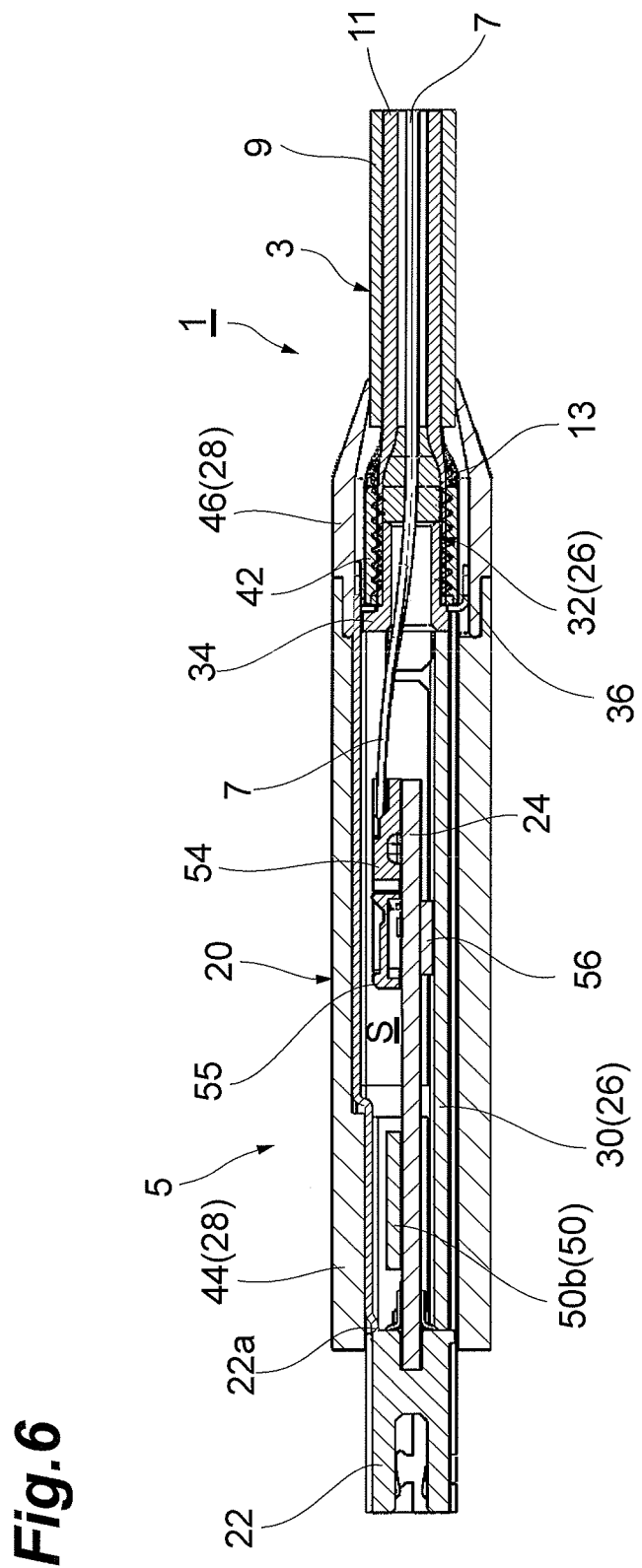
FIG. 6 is a cross-sectional view of the connector assembly illustrated in FIG. 1.
Figure 7:
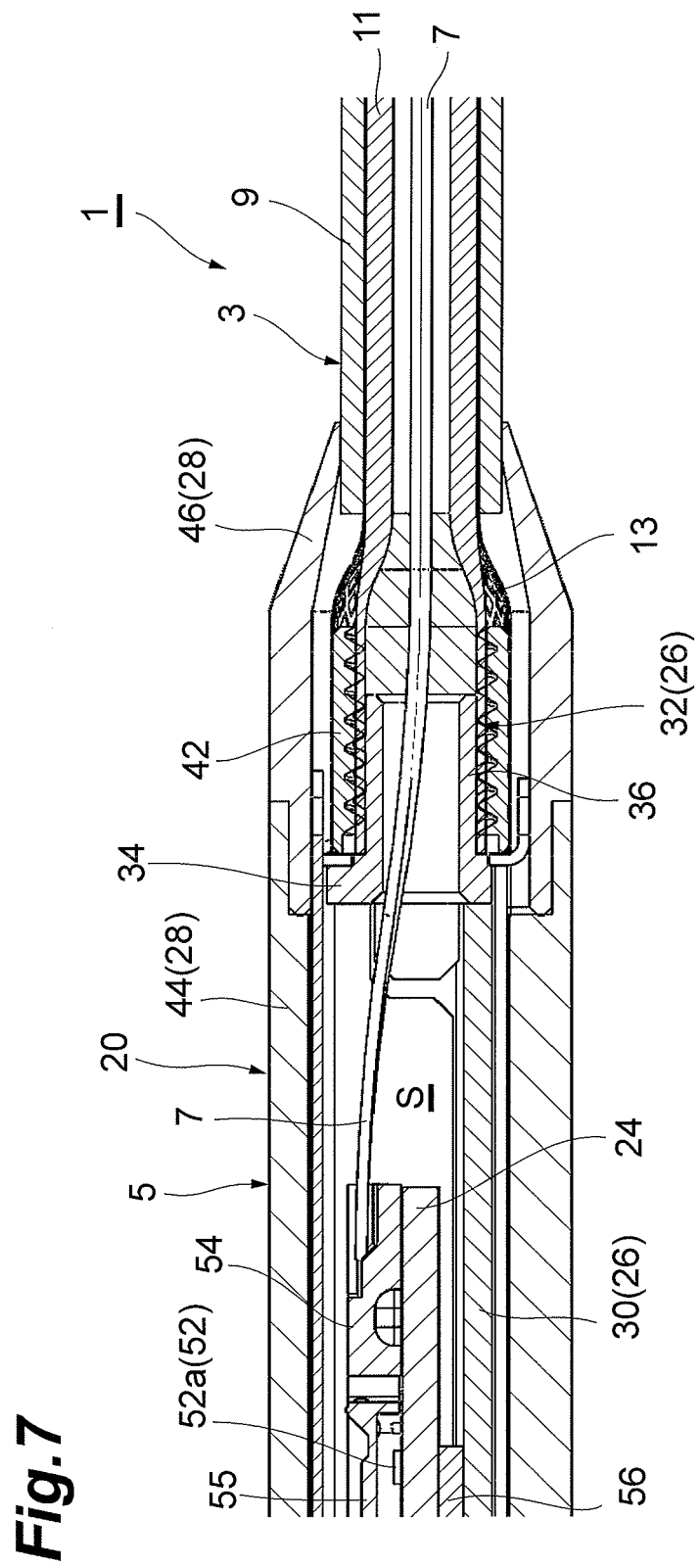
FIG. 7 is a diagram enlarging a part of FIG. 6.

FIG. 1 is a perspective view illustrating a connector assembly according to the first embodiment. FIG. 2 is a perspective view illustrating a state in which a resin housing is removed. FIG. 3 is a perspective view illustrating a state in which a housing is removed. FIG. 4A is a diagram of a circuit board illustrated in FIG. 3 from the top view and FIG. 4B is a diagram of the circuit board illustrated in FIG. 3 from the side view. FIG. 5 is a diagram of the circuit board and a fixing member illustrated in FIG. 3 from the side view. FIG. 6 is a cross-sectional view of the connector assembly illustrated in FIG. 1. FIG. 7 is a diagram enlarging a part of FIG. 6.

The connector assembly 1 illustrated in each figure is used to transmit a signal (data) in an optical communication technology, and the like, and is electrically connected to electronic apparatuses such as a PC, and the like at a connection destination and converts electrical signals which are input and output into optical signals to transmit the converted optical signals.

As illustrated in each figure, the connector assembly 1 includes an optical cable 3 and a connector module 5. In the connector assembly 1, a terminal of a single-core or multi-core optical cable 3 is configured to be attached to the connector module 5.

The optical cable 3 includes a plurality of (herein, four) optical fiber core wires (optical fibers) 7, a resin-made outer cover 9 covering the optical fiber core wires 7, a tensile strength fiber (Kevlar) 11 of a very small diameter interposed between the optical fiber core wire 7 and the outer cover 9, and a metallic braid 13 interposed between the outer cover 9 and the tensile strength fiber 11 and contacting the outer cover 9. That is, in the optical cable 3, the optical fiber core wire 7, the tensile strength fiber 11, the metallic braid 13, and the outer cover 9 are arranged in this order outward in a diameter direction from the center thereof.

As the optical fiber core wire 7, a quartz-based optical fiber, a plastic optical fiber (POF), and the like may be used. The outer cover 9 is made of for example, polyvinyl chloride (PVC) which is a non-halogen fire-retardant resin. The outer diameter of the outer cover 9 is approximately 4.2 mm and thermal conductivity of the outer cover 9 is for example, 0.17 W/m·K. The tensile strength fiber 11 is for example, an aramid fiber and is embedded in the optical cable 3 while the tensile strength fiber 11 is gathered in bundle.

The metallic braid 13 is formed by for example, a tin-plated wire, and braid density is 70% or more and a braiding angle is in the range of 45° to 60°. The outer diameter of the metallic braid is approximately 0.05 mm. The thermal conductivity of the metallic braid 13 is for example, 400 W/m·K. The metallic braid 13 is preferably arranged with high density in order to excellently ensure the thermal conduction and as one example, is preferably configured by a rectangular tin-plated wire.

The connector module 5 includes a housing 20, an electrical connector 22 provided at a front end (leading end) of the housing 20, and a circuit board 24 received in the housing 20.

The housing 20 is configured by a metal housing (first housing) 26 and a resin housing (second housing) 28. The metal housing 26 is configured by a receiving member 30 and a fixing member 32 connected to a rear end of the receiving member 30 and fixing the optical cable 3. The metal housing 26 is made of a metallic material having high thermal conductivity (preferably, 100 W/m·K or more) such as steel (Fe based), tin plate (tin-plated copper), stainless, copper, brass, aluminum, and the like. The metal housing 26 configures a thermal conductor.

The receiving member 30 is a cylindrical hollow member having substantially a rectangular cross section. The receiving member 30 defines a receiving space S receiving the circuit board 24, and the like. The electrical connector 22 is provided at a front end of the receiving member 30 and the fixing member 32 is connected to a rear end of the receiving member 30.

The fixing member 32 includes a plate-shaped base portion 34, a cylinder portion 36, a pair of first projecting piece 38 that project forward from both sides of the base portion 34, and a pair of second projecting piece 40 that project backward from both sides of the base portion 34. Each of the pair of first projecting piece 38 is inserted from a rear portion of the receiving member 30 and is connected while contacting the receiving member 30. The pair of second projecting piece 40 are connected to a boot 46 of the resin housing 28 to be described below. Further, in the fixing member 32, the base portion 34, the cylinder portion 36, the first projecting piece 38, and the second projecting piece 40 are integrally formed by plating.

The cylinder portion 36 has substantially a cylindrical shape and is provided to protrude backward from the base portion 34. The cylinder portion 36 holds the optical cable 3 in cooperation with a clamping ring 42. In detail, after the outer cover 9 is peeled off, the optical fiber core wire 7 of the optical cable 3 is inserted into the cylinder portion 36 and the tensile strength fiber 11 is arranged on an outer peripheral surface of the cylinder portion 36. The clamping ring 42 is arranged on the tensile strength fiber 11 arranged on the outer peripheral surface of the cylinder portion 36 and the clamping ring 42 is clamped. By this configuration, the tensile strength fiber 11 is caught and fixed between the cylinder portion 36 and the clamping ring 42 and the optical cable 3 is held and fixed onto the fixing member 32.

An end of the metallic braid 13 of the optical cable 3 is joined to the base portion 34 by soldering. In detail, the metallic braid 13 is arranged to cover an outer periphery of the clamping ring 42 (cylinder portion 36) in the fixing member 32, and an end thereof extends up to one surface (rear surface) of the base portion 34 to be joined by soldering. As a result, the fixing member 32 and the metallic braid 13 are thermally connected. Further, since the fixing member 32 is coupled to the rear end of the receiving member 30, the receiving member 30 and the fixing member 32 are physically and thermally connected. That is, the receiving member 30 and the metallic braid 13 of the optical cable 3 are thermally connected.

The resin housing 28 is made of for example, a resin material such as polycarbonate, and the like and covers the metal housing 26. The resin housing 28 includes an exterior housing 44 and the boot 46 connected with the exterior housing 44. The exterior housing 44 is provided to cover an outer surface of the receiving member 30. The boot 46 is connected to a rear end of the exterior housing 44 and covers the fixing member 32 of the metal housing 26. A rear end of the boot 46 and the outer cover 9 of the optical cable 3 is bonded by a bonding agent (not illustrated).

The electrical connector 22 is inserted into a connection target (a personal computer, and the like) and electrically connected with the connection target. The electrical connector 22 is arranged at a front end of the housing 20, and the electrical connector 22 protrudes forward from the housing 20. The electrical connector 22 is electrically connected to the circuit board 24 by a contact 22a.

The circuit board 24 is received in the receiving space S of the metal housing 26 (receiving member 30). A controlling semiconductor 50 and a light receiving/emitting element 52 are mounted on the circuit board 24. The circuit board 24 electrically connects the controlling semiconductor 50 and the light receiving/emitting element 52 with each other. The circuit board 24 has substantially a rectangular shape from the plan view and has a predetermined thickness. The circuit board 24 is an insulating substrate such as for example, a glass epoxy substrate, a ceramic substrate, and the like, and a circuit wire made of gold (Au), aluminum (Al), or copper (Cu) is formed on the surface thereof and therein. The controlling semiconductor 50 and the light receiving/emitting element 52 configure the photoelectric conversion unit. In the embodiment, the controlling semiconductor 50 is arranged in front of the light receiving/emitting element 52 and in the rear of the electrical connector 22, in the circuit board 24. The controlling semiconductor 50 has a larger heat generation amount than the light receiving/emitting element 52.

The controlling semiconductor 50 includes a driving integrated circuit (IC) 50a and a clock data recovery device 50b which is a waveform shaper. The controlling semiconductor 50 is arranged at a front end of the surface 24a in the circuit board 24. The controlling semiconductor 50 is electrically connected with the electrical connector 22.

The light receiving/emitting element 52 include a plurality of (herein, two) light emitting elements 52a and a plurality of (herein, two) light receiving elements 52b. The light emitting elements 52a and the light receiving elements 52b are arranged at the rear end of the surface 24a in the circuit board 24. As the light emitting element 52a, for example, a light emitting diode (LED), a laser diode (LD), a vertical cavity surface emitting laser (VCSEL), and the like may be used. As the light receiving element 52b, for example, a photo diode (PD), and the like may be used.

The light receiving/emitting element 52 is optically connected with the optical fiber core wire 7 of the optical cable 3. In detail, as illustrated in FIG. 4B, a lens array part 55 is arranged in the circuit board 24 to cover the light receiving/emitting element 52 and the driving IC 50a. A reflection film 55a that reflects and bends light emitted from the light emitting element 52a or light emitted from the optical fiber core wire 7 is arranged in the lens array part 55. A connector part 54 is attached to a terminal of the optical fiber core wire 7, and the connector part 54 and the lens array part 55 are positioned by a positioning pin and coupled to each other, and as a result, the optical fiber core wire 7 and the light receiving/emitting element 52 are optically connected to each other. The lens array part 55 preferably includes a collimate lens that converts incident light into parallel light and collects and emits the parallel light, in an incoming portion and an outgoing portion of light. The lens array part 55 may be integrally configured by injection molding of a resin.

A heat dissipation sheet (connection member) 56 is arranged between the circuit board 24 and the receiving member 30 (metal housing 26). The heat dissipation sheet 56 is a thermal conductor made of a material having thermal conductivity and flexibility. The heat dissipation sheet 56 extends in the width direction of the circuit board 24, on a rear surface 24b of the circuit board 24. The heat dissipation sheet 56 is arranged for example, below the light receiving/emitting element 52. The top of the heat dissipation sheet 56 is physically and thermally connected to the rear surface 24b of the circuit board 24 and the bottom thereof is physically and thermally connected to an inner surface of the receiving member 30. By the heat dissipation sheet 56, the circuit board 24 and the metal housing 26 are thermally connected to each other and heat of the circuit board 24 is transferred to the receiving member 30.

Further, the thermal connection described herein means that a heat transferrable route is established by physical connection. Therefore, in the embodiment, transferring heat through a medium such as air, and the like does not mean thermal connection.

In the connector assembly 1 having the configuration, the electrical signal is input from the electrical connector 22 and the controlling semiconductor 50 inputs the electrical signal through the wire of the circuit board 24. The electrical signal input into the controlling semiconductor 50 is subjected to waveform shaping by adjustment of a level or the CDR device 50b and thereafter, output from the controlling semiconductor 50 to the light receiving/emitting element 52 through the wire of the circuit board 24. The light receiving/emitting element 52 input with the electrical signal converts the electrical signal into the optical signal and emits the optical signal from the light emitting element 52a to the optical fiber core wire 7.

Further, the optical signal transmitted through the optical cable 3 is incident by the light receiving element 52b. The light receiving/emitting element 52 converts the incident optical signal into the electrical signal and outputs the electrical signal to the controlling semiconductor 50 through the wire of the circuit board 24. In the controlling semiconductor 50, the electrical signal is subjected to predetermined processing and thereafter, the electrical signal is output to the electrical connector 22.

Continuously, a heat dissipation method in the connector assembly 1 will be described with reference to FIG. 6. Heat generated from the controlling semiconductor 50 and the light receiving/emitting element 52 mounted on the circuit board 24 is first transferred to the circuit board 24. The heat transferred to the circuit board 24 is transferred to the receiving member 30 through the heat dissipation sheet 56. Subsequently, heat is transferred from the receiving member 30 to the fixing member 32 connected thereto and transferred to the metallic braid 13 of the optical cable 3 connected to the fixing member 32. Further, the heat transferred to the metallic braid 13 is dissipated to the outside through the outer cover 9 of the optical cable 3. By this configuration, in the connector assembly 1, the heat generated from the controlling semiconductor 50 and the light receiving/emitting element 52 as heating elements is dissipated to the outside.

As described above, in the embodiment, the metallic braid 13 having high thermal conductivity is provided in the optical cable 3, and the circuit board 24 on which the heating element such as the controlling semiconductor 50 and the light receiving/emitting element 52 is mounted, and the metallic braid 13 are thermally connected by the metal housing 26. As a result, the heat generated by the controlling semiconductor 50 and the light receiving/emitting element 52 is transferred to the metallic braid 13 of the optical cable 3 through the circuit board 24 and the metal housing 26, and dissipated from the outer cover 9 of the optical cable 3 to the outside. That is, in the connector assembly 1, the heat dissipation route is established between the connector module 5 and the optical cable 3 and thus heat is transferred to the optical cable, and as a result, the heat of the circuit board 24 may be efficiently radiated to the optical cable 3. As a result, in the connector assembly 1, since the housing 20 does not excessively have heat, a feeling of strangeness to a user may be reduced.

Herein, it is also considered that the heat is dissipated to the connection target such as the PC, and the like through the electrical connector 22. However, it is difficult to predict in state whether the connection target is able to accept the dissipated heat at the time of dissipating the heat. As a result, when the temperature of the connection target increases at the time of dissipating the heat, the heat of the connector assembly 1 may not sufficiently be radiated to the connection target. In this regard, in the embodiment, since the heat of the circuit board 24 is radiated to the optical cable 3 and the heat is dissipated to the outside, the heat may be sufficiently dissipated without depending on a state of a connection destination of the connector assembly 1.

Further, in the embodiment, the thermal conductivity of the metallic braid 13 (heat transfer member) is larger than that of the metal housing 26 and the heat dissipation sheet 56 (thermal conductor). As a result, since the heat of the metal housing 26 may be efficiently radiated to the optical cable 3, the heat of the circuit board 24 may be efficiently radiated to the optical cable 3. Further, when the resin housing 28 receiving the metal housing 26 configuring the thermal conductor is further provided, the heat dissipation from the metal housing 26 is interfered by the resin housing 28, but the heat of the circuit board 24 is efficiently radiated to the optical cable 3, thereby efficiently decreasing the temperature in the receiving member 30. By this configuration, reliability of the light receiving/emitting element 52 is improved and when the user touches the housing 20, the user less feels heat (hotness).

Further, in the embodiment, the circuit board 24 and the metal housing 26 (fixing member 32) are thermally connected with each other by the heat dissipation sheet 56. By this configuration, in the connector assembly 1, the heat of the circuit board 24 may be efficiently transferred to the metal housing 26. As a result, the heat transfer route which is excellent in transfer efficiency may be established between the circuit board 24 and the optical cable 3. In addition, in the connector assembly 1, the metallic braid 13 may be joined to the fixing member 32 by soldering to acquire more definite thermal connection.

Further, the optical cable 3 includes the optical fiber core wire 7, the resin-made outer cover 9 covering the optical fiber core wire 7, the tensile strength fiber 11 interposed between the optical fiber core wire 7 and the outer cover 9, and the metallic braid 13 interposed between the outer cover 9 and the tensile strength fiber 11, and the optical fiber core wire 7, the tensile strength fiber 11, the metallic braid 13, and the outer cover 9 are arranged outward in the diameter direction thereof from the center thereof in this order. By this configuration, in the connector assembly 1, durability against external force such as tensile force, and the like applied to the optical cable 3 may be ensured in the optical cable 3, while the tensile strength fiber 11 is provided between the optical fiber core wire 7 and the metallic braid 13, and as a result, it is possible to prevent dissipation of the generated heat from the heat conductor to the outside through the outer cover 9 from being interfered. In addition, in the connector assembly 1, no space is interposed between the outer cover 9 and the metallic braid 13 which are closely attached to each other, thereby efficiently diffusing heat from the metallic braid 13 to the outer cover 9.

Further, in the connector assembly 1, since the metal housing 26 as the thermal conductor is received in the resin housing 28, the heat of the circuit board 24 is radiated to the optical cable 3 having high thermal conductivity. Accordingly, in the connector assembly 1, the heat transfer route for radiating heat to the optical cable 3 may be significantly configured. In addition, in the connector assembly 1, when the user touches the housing 20 by using the resin housing 28, the user feels less hotness.

Second Embodiment

Figure 8:
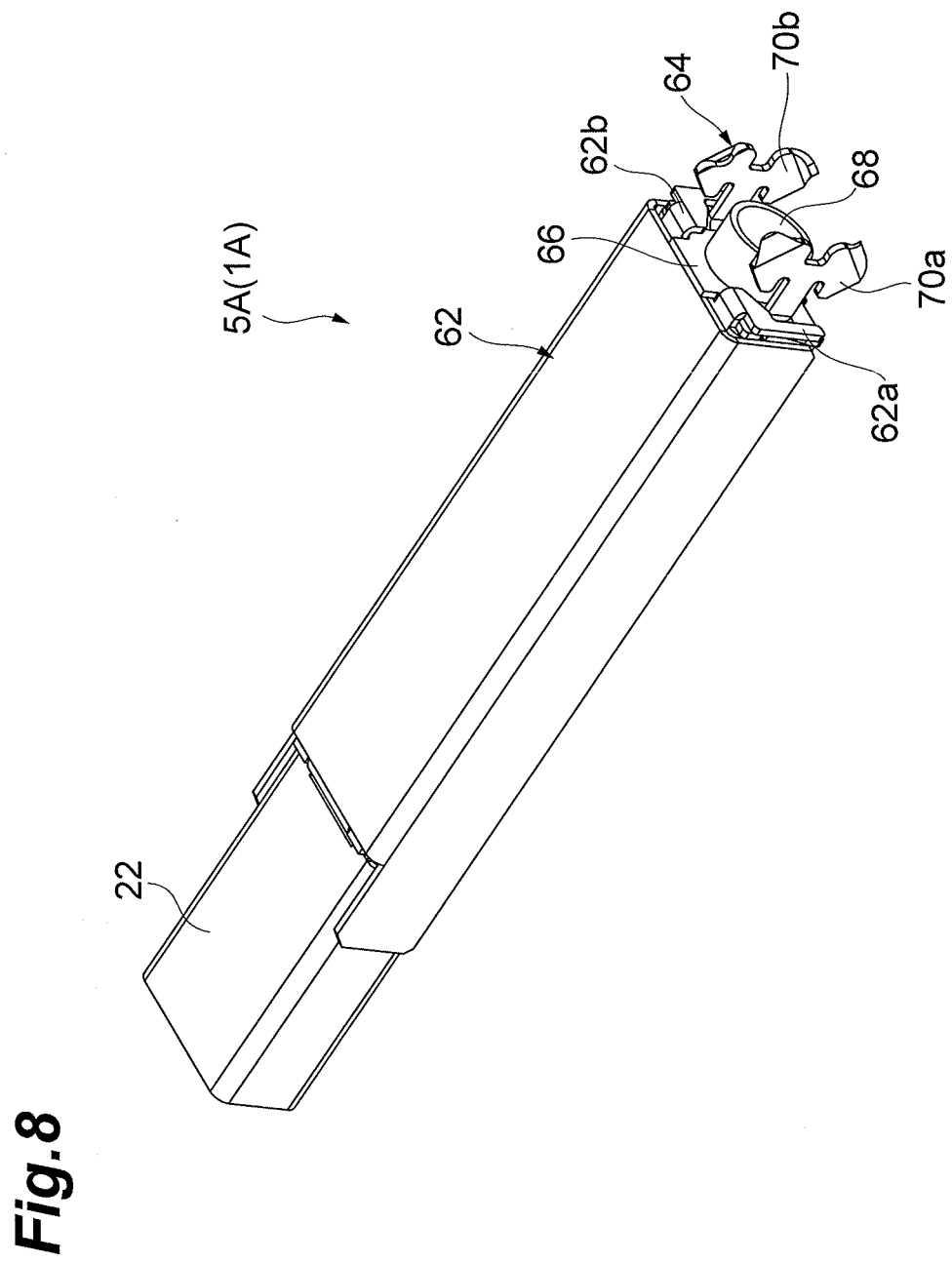
FIG. 8 is a perspective view illustrating a connector module of a connector assembly according to a second embodiment.
Figure 9:
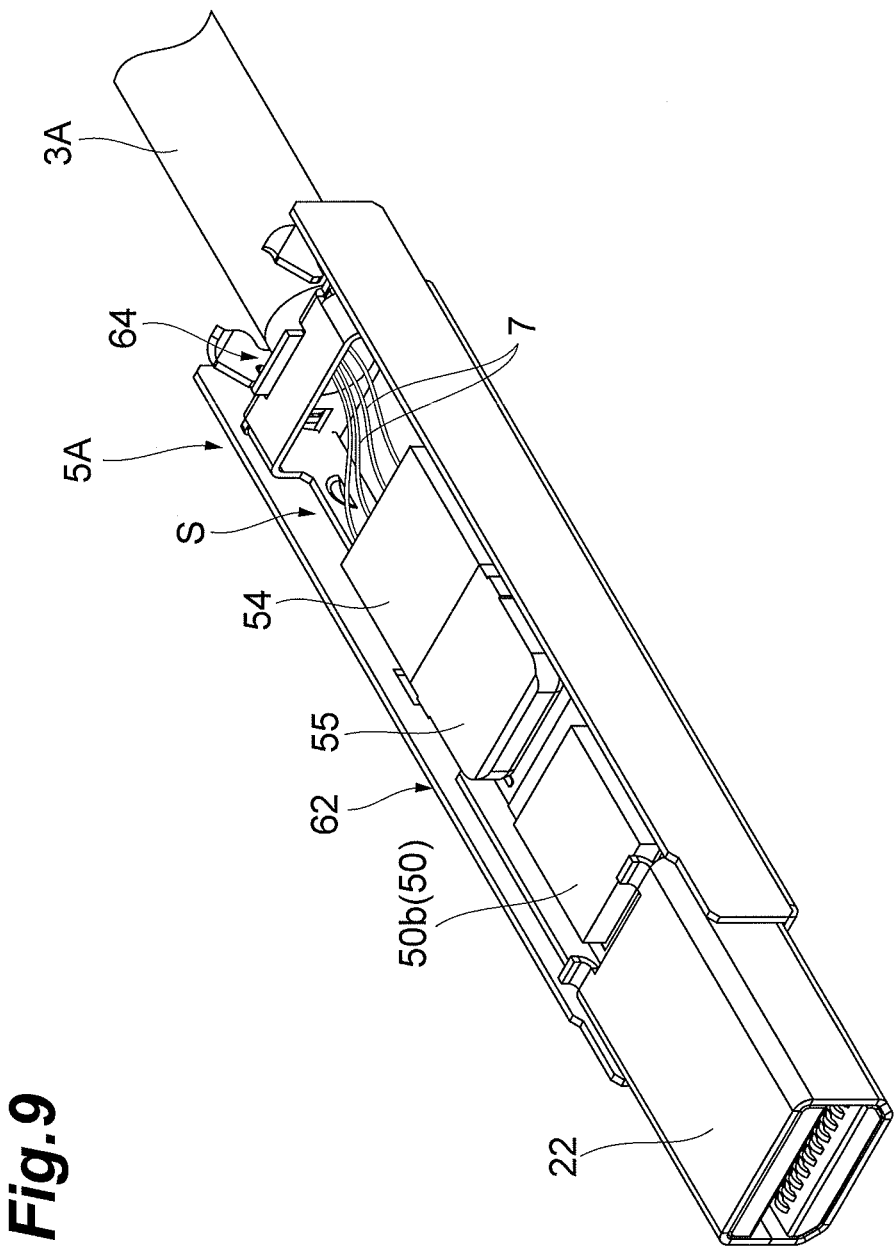
FIG. 9 is a perspective view illustrating a state in which a part of the housing is removed.
Figure 10:
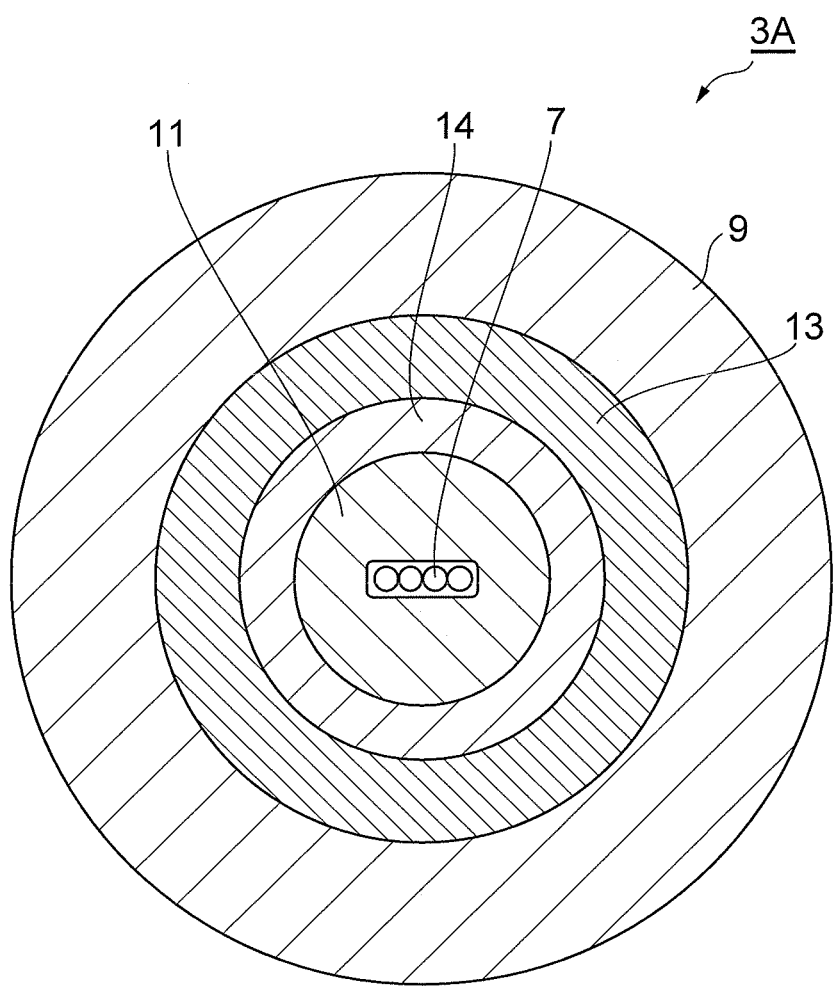
FIG. 10 is a diagram illustrating a cross-sectional configuration of an optical table.

Continuously, a second embodiment will be described. FIG. 8 is a perspective view illustrating a connector module of a connector assembly according to the second embodiment. FIG. 9 is a perspective view illustrating a state in which a part of the housing is removed. FIG. 10 is a diagram illustrating a cross-sectional configuration of an optical table. A connector assembly 1A includes an optical cable 3A and a connector module 5A.

As illustrated in FIG. 10, the optical cable 3A includes a plurality of (herein, four) optical fiber core wires 7, a resin-made outer cover 9 covering the optical fiber core wires 7, a tensile strength fiber 11 of a very small diameter interposed between the optical fiber core wire 7 and the outer cover 9, a metallic braid 13 interposed between the outer cover 9 and the tensile strength fiber 11 and contacting the outer cover 9, and an inner tube 14 interposed between the tensile strength fiber 11 and the metallic braid 13. That is, in the optical cable 3A, the optical fiber core wire 7, the tensile strength fiber 11, the inner tube 14, the metallic braid 13, and the outer cover 9 are arranged outward in a diameter direction thereof from the center thereof in this order.

The connector module 5A includes a housing 60, an electrical connector 22 provided at a front end (leading end) of the housing 60, and a circuit board 24 received in the housing 60. Further, the configurations of the electrical connector 22, the circuit board 24, and the heat dissipation sheet 56 has the same configuration as in the first embodiment.

The housing 60 is configured by a metal housing 61 and a resin housing (not illustrated). The metal housing 61 is configured by a receiving member 62 and a clamping member 64 connected to a rear end of the receiving member 62 and fixing the optical cable 3A. The metal housing 61 is made of metallic materials having high thermal conductivity (preferably, 100 W/m·K or more) such as steel (Fe based), tin plate (tin-plated copper), stainless, copper, brass, aluminum, and the like. The metal housing 61 configures a thermal conductor.

The receiving member 62 is a cylindrical hollow member having substantially a rectangular cross section. The receiving member 62 defines a receiving space S (see FIG. 9) receiving the circuit board 24, and the like. The electrical connector 22 is provided at a front end of the receiving member 62 and the clamping member 64 is connected to a rear end of the receiving member 62. The receiving member 62 is configured by a plurality of members. The rear end of the receiving member 62 is opened.

Holding pieces 62a and 62b are provided in the receiving member 62. The holding pieces 62a and 62b are provided as a pair at both ends (left and right sides) on the rear end of the receiving member 62, and bent downward from the top of the receiving member 62 to extend downward.

Figure 11:
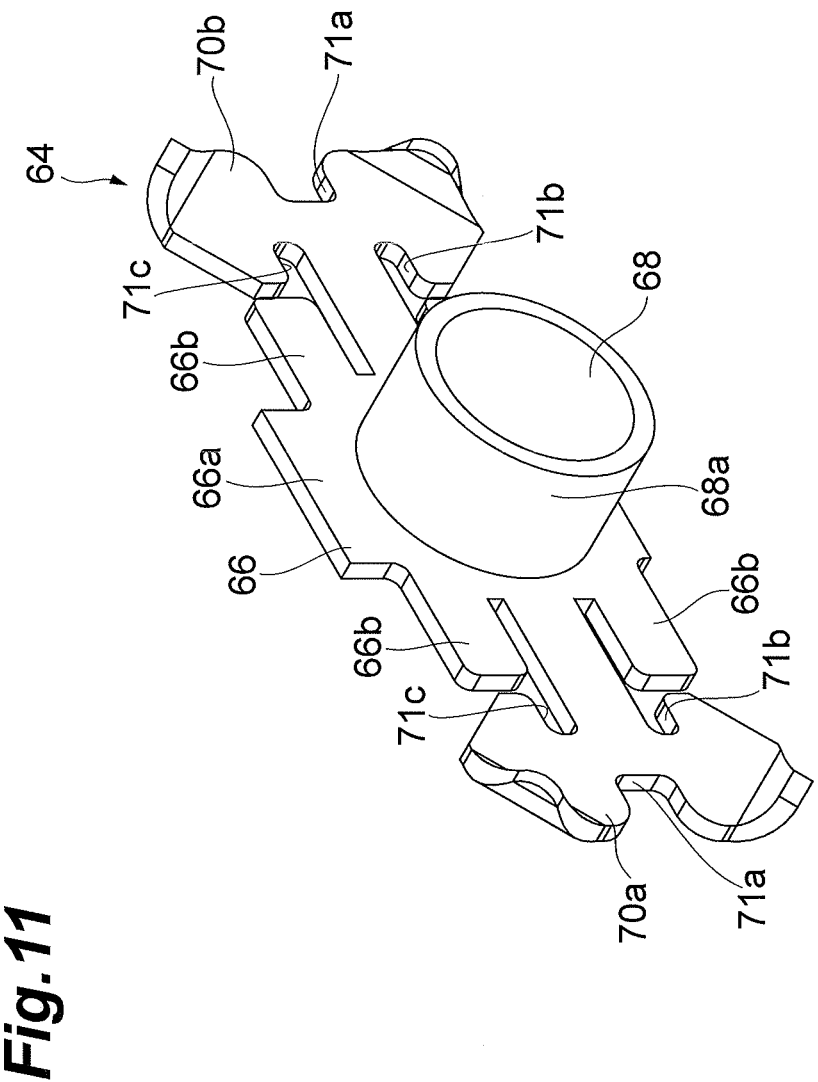
FIG. 11 is a perspective view illustrating a clamping member.

FIG. 11 illustrates a perspective view illustrating the clamping member and illustrates a state before connection with the receiving member (a state before the clamping member is bent). The clamping member 64 includes a base portion 66, a cylinder portion 68, and a pair of clamping portions 70a and 70b that project backward from both sides of the base portion 66. In the clamping member 64, the base portion 66, the cylinder portion 68, and the clamping portions 70a and 70b are integrally formed by plating.

The base portion 66 is a plate-shape member and flare outward in a diameter direction of the cylinder portion 68. The base portion 66 includes a main body portion 66a and projecting portions 66b. The projecting portions 66b project in a horizontal direction of the main body portion 66a and are provided vertically by a predetermined gap.

The cylinder portion 68 has substantially a cylindrical shape and is provided to protrude backward from the main body portion 66a of the base portion 66. The cylinder portion 68 is inserted into the optical fiber core wire 7 and holds the optical cable 3A in cooperation with the clamping portions 70a and 70b.

The clamping portions 70a and 70b clamp the optical cable 3A in cooperation with the cylinder portion 68 and are wound with the tensile strength fiber 11. The clamping portion 70a and the clamping 70b have the same configuration, and hereinafter, the clamping portion 70a will be described in detail as one example. The clamping portion 70a is bent from the base portion 66 to be positioned outward in the diameter direction of the cylinder portion 68. Concave portions 71a and two slit portions 71b and 71c are provided at the clamping portion 70a. The concave portions 71a and the slit portions 71b and 71c are wound with the tensile strength fiber 11. A method of winding the tensile strength fiber 11 on the clamping portions 70a and 70b will be described below.

Continuously, connection of the clamping member 64 and the receiving member 62, which has the configuration, will be described. When the clamping member 64 is connected to the receiving member 62, the clamping member 64 press-fits between the holding pieces 62a and 62b of the receiving member 62 from the bottom. As a result, the clamping member 64 and the receiving member 62 are connected with each other such that the projecting portion 66b that project from the top of the main body portion 66a of the base portion 66 is held between the holding pieces 62a and 62b.

Figure 12:
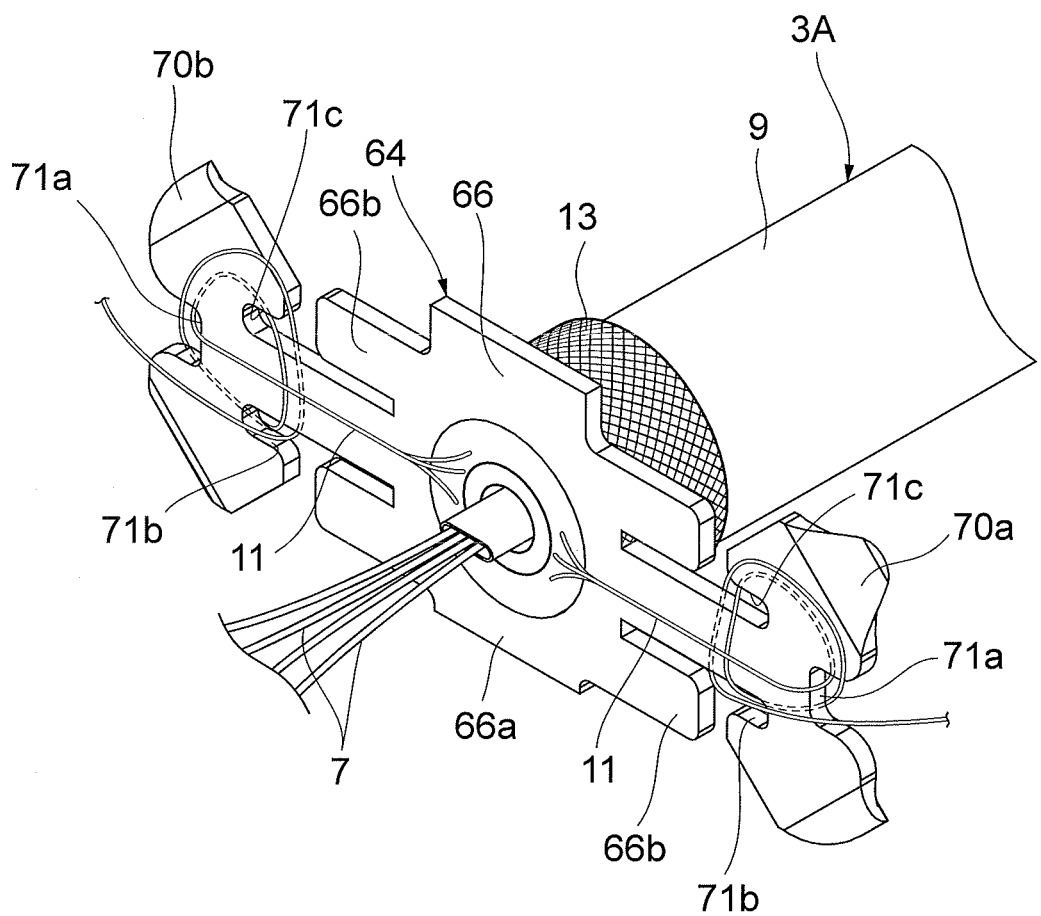
FIG. 12 is a diagram illustrating a method of attaching the optical cable to the clamping member.
Figure 13:
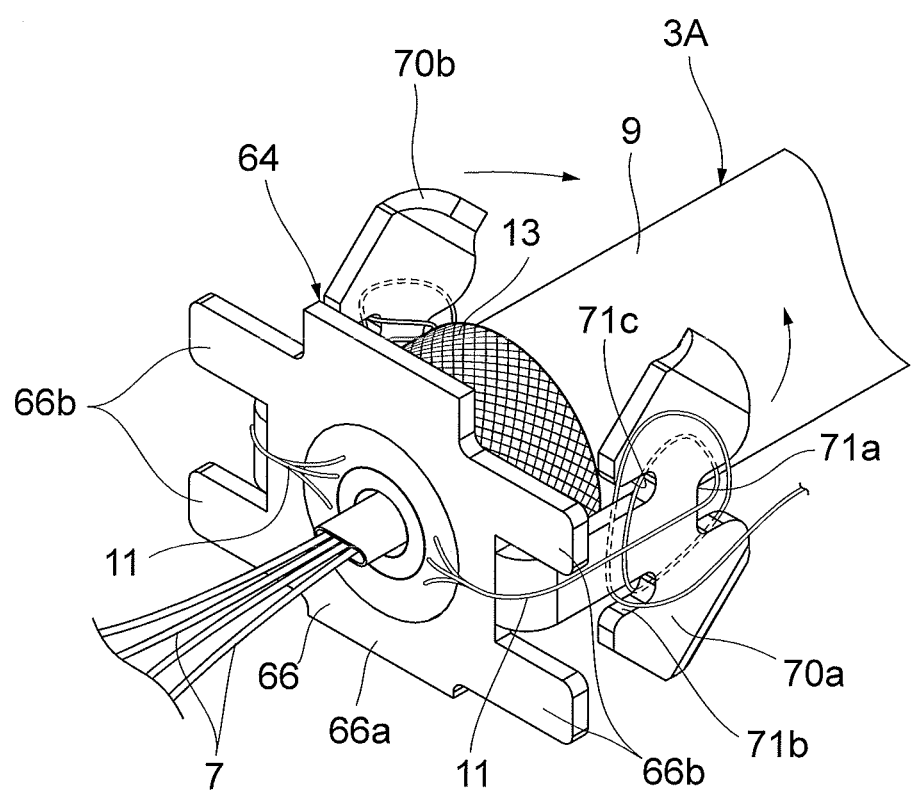
FIG. 13 is a diagram illustrating a method of attaching the optical cable to the clamping member.
Figure 14:
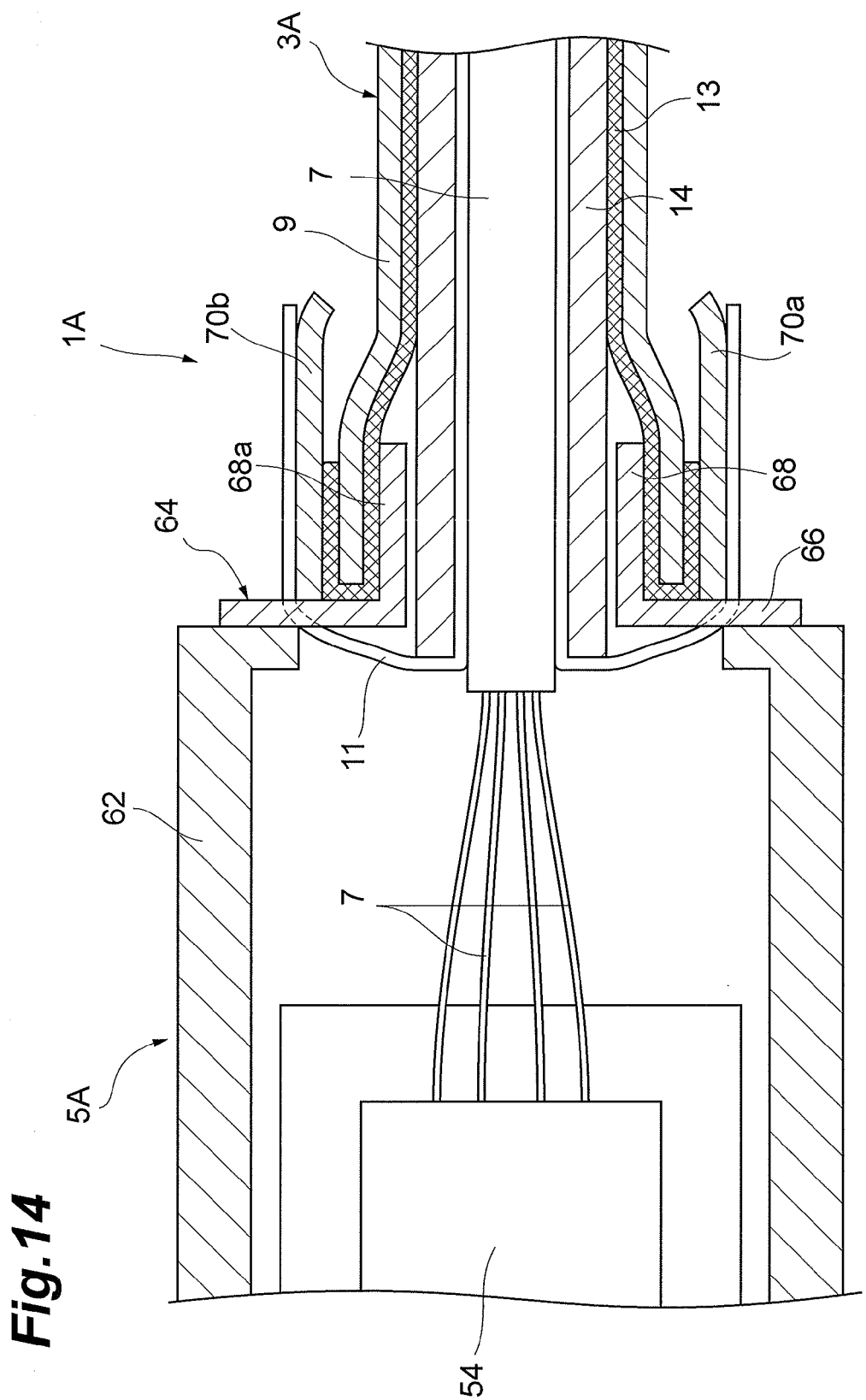
FIG. 14 is a diagram illustrating a cross-sectional configuration of the connector assembly.

Continuously, a method of attaching the optical cable 3A to the clamping member 64 will be described. FIGS. 12 and 13 are diagrams illustrating a method of attaching the optical cable to the clamping member. FIG. 14 is a diagram illustrating a. cross-sectional configuration of the connector assembly. As illustrated in FIG. 12, the clamping portions 70a and 70b of the clamping member 64 are not bent in state before the optical cable 3A is attached to the clamping member 64. First, the metallic braid 13 is exposed by peeling off the outer cover 9 of the optical cable 3A, and the metallic braid 13 is bent at an outer periphery side of the outer cover 9. In this case, a bent length of the metallic braid 13 is set to, for example, the length of the cylinder portion 68 or less. Subsequently, the clamping member 64 is prepared, and the optical fiber core wire 7, the tensile strength fiber 11, and the inner tube 14 of the optical cable 3A are inserted into the cylinder portion 68 of the clamping member 64 and the metallic braid 13 is covered on an outer peripheral surface 68a of the cylinder portion 68.

Continuously, the tensile strength fiber 11 is wound on the clamping portions 70a and 70b. In detail, the tensile strength fiber 11 is drawn horizontally on a front surface of the base portion 66 to be caught and bent by the concave portions 71a of the clamping portions 70a and 70b. Subsequently, the tensile strength fiber 11 passes through the slit portion 71c and thereafter, passes through the slit portion 71b, and caught by the concave portion 71a again. By this configuration, the tensile strength fiber 11 is wound on the clamping portions 70a and 70b.

After the tensile strength fiber 11 is wound, the clamping portions 70a and 70b are bent to the optical cable 3A side. In this case, as illustrated in FIG. 14, the metallic braid 13 contacts the outer peripheral surface 68a of the cylinder portion 68, the rear surface of the base portion 66, and the clamping portions 70a and 70b. When the clamping portions 70a and 70b is bent, the outer cover 9 and the metallic braid 13 are sandwiched between the cylinder portion 68 and base portions of the clamping portions 70a and 70b and clamped at this portion, the clamping portions 70a and 70b dip into the outer cover 9, and the optical cable 3A is held and fixed by the clamping member 64. As described above, the optical cable 3A is clamped by the clamping portions 70a and 70b to be clamped to the clamping member 64, and the metallic braid 13 of the optical cable 3A and the clamping member 64 (metal housing 61) are thermally connected to each other.

Continuously, a heat dissipation method in the connector assembly 1A will be described. Beat generated from a controlling semiconductor 50 and a light receiving/emitting element 52 mounted on the circuit board 24 is first transferred to the circuit board 24. The heat transferred to the circuit board 24 is transferred to the receiving member 62 through the heat dissipation sheet 56. Subsequently, the heat is transferred from the receiving member 62 to the clamping member 64 connected thereto and transferred to the metallic braid 13 of the optical cable 3 connected to the clamping member 64. Further, the heat transferred to the metallic braid 13 is dissipated to the outside through the outer cover 9 of the optical cable 3A. By this configuration, in the connector assembly 1A, the heat generated from the controlling semiconductor 50 and the light receiving/emitting element 52 as heating elements is dissipated to the outside.

As described above, in the embodiment, the circuit board 24 on which the heating element such as the controlling semiconductor 50 and the light receiving/emitting element 52 is mounted, and the metallic braid 13 are thermally connected by the metal housing 61. By this configuration, the heat generated from the controlling semiconductor 50 and the light receiving/emitting element 52 is transferred to the metallic braid 13 of the optical cable 3A through the circuit board 24 and the metal housing 61 (receiving member 62 and clamping member 64), and dissipated from the outer cover 9 of the optical cable 3A to the outside. That is, a heat dissipation route is established between a connector module 5A and the optical cable 3A and thus heat is transferred to the optical cable 3A, and as a result, the heat of the circuit board 24 may be efficiently radiated to the optical cable 3A.

Further, in the embodiment, thermal conductivity of the metallic braid 13 (heat transfer member) is larger than those of the metal housing 61 and the heat dissipation sheet 56 (thermal conductor). As a result, since the heat of the metal housing 61 may be efficiently radiated to the optical cable 3A, the heat of the circuit board 24 may be efficiently radiated to the optical cable 3A. In addition, when the resin housing (not illustrated) receiving the metal housing 61 configuring the thermal conductor is further provided, the heat dissipation from the metal housing 61 is interfered by the resin housing, but the heat of the circuit board 24 is efficiently radiated to the optical cable 3A, thereby efficiently decreasing the temperature in the receiving member 62. As a result, reliability of the light receiving/emitting element 52 is improved and when a user touches the housing 60, the user less feels heat (hotness).

Further, in the embodiment, by the configuration in which the optical cable 3A is clamped to be held and fixed by the clamping member 64, the optical cable 3A may be easily joined to the metal housing 61. By this configuration, assembling workability of the connector assembly 1A in a work site may be improved.

Further, the metallic braid 13 contacts(abuts) the base portion 66, the outer peripheral surface 68a of the cylinder portion 68, and the clamping portions 70a and 70b, in the clamping member 64. As such, the metallic braid 13 and the clamping member 64 contact each other at a lot of spots and a contact area between the metallic braid 13 and the clamping member 64 is ensured, thereby excellently ensuring the heat dissipation route. Accordingly, the heat of the circuit board 24 may be efficiently radiated by the optical cable 3A.

Further, in the embodiment, the inner tube 14 is provided between the tensile strength fiber 11 and the metallic braid 13, in the optical cable 3A. Heat may be suppressed from being transferred inside the optical cable 3A by the inner tube 14, and heat may be excellently dissipated outside through the outer cover 9. Since a surface area of the outer cover 9 is larger than that of the inner tube 14 in the optical cable 3A, the thermal conductivity of the inner tube 14 may be equal to or less than that of the outer cover 9.

The present invention is not limited to the embodiment. For example, the optical cable 3A of the second embodiment may be used in the connector assembly 1 of the first embodiment.

Further, in the first embodiment, the fixing member 32 and the metallic braid 13 are joined to each other by soldering, but the joining method of the fixing member 32 and the metallic braid 13 is not limited to soldering. In addition, in the first embodiment, when it is assumed that external force may be applied to a joining portion, a joining method in which the joining is not easily released needs to be selected and the joining method using soldering is most preferable.

Further, in the first embodiment, a transfer route of heat is configured by the heat dissipation sheet 56, the receiving member 30, and the fixing member 32, but the fixing member 32 may be directly connected (fixed) to the circuit board 24 to configure the transfer route of the heat.

Figure 15:
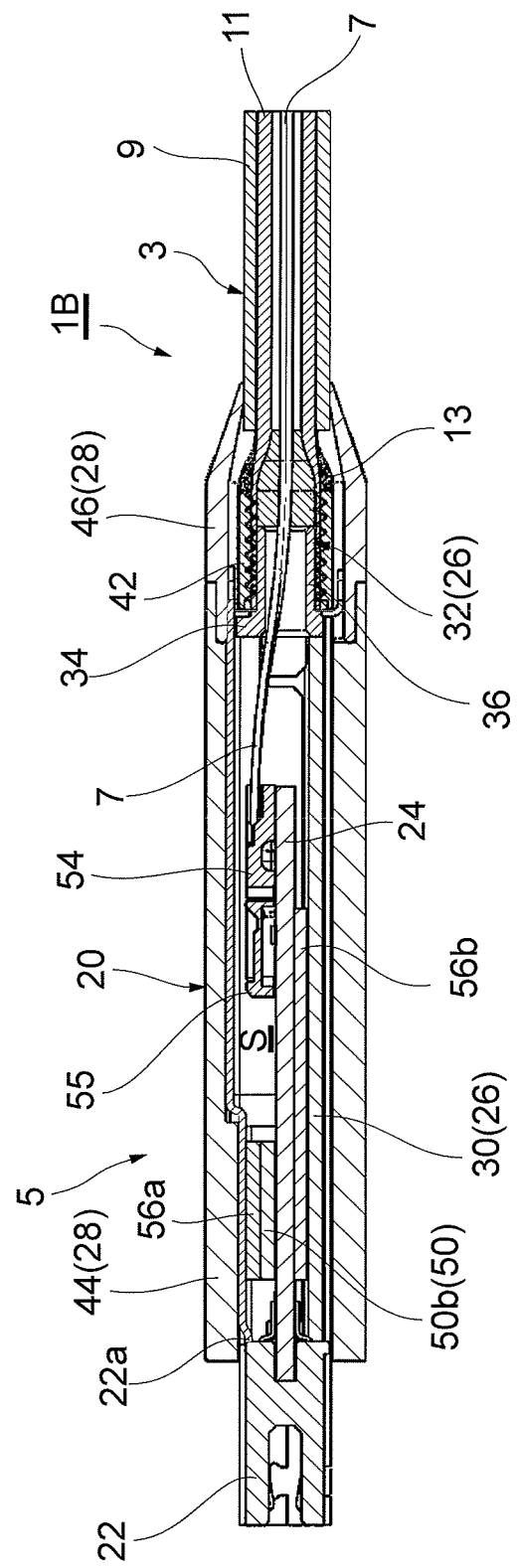
FIG. 15 is a diagram illustrating a cross-sectional configuration of a connector assembly according to another embodiment.

In addition, in the embodiment, the top of the heat dissipation sheet 56 as a connection member is physically and thermally connected to a rear surface 24b of the circuit board 24 and the bottom thereof is physically and thermally connected to an inner surface of the receiving member 30 (62), but the connection member may have, for example, a configuration illustrated in FIG. 15. FIG. 15 is a diagram illustrating a cross-sectional configuration of a connector assembly according to another embodiment.

As illustrated in FIG. 15, in a connector assembly 1B, a first heat dissipation sheet 56a and a second heat dissipation sheet 56b are arranged between the circuit board 24 and the receiving member 30 (62) (metal housings 26 and 61). The first heat dissipation sheet 56a is arranged between a clock data recovery (CDR) device 50b arranged at a front end side of a surface 24a of the circuit board 24 and the metal housing 26 (61), and thermally connects both parts to each other.

Further, the second heat dissipation sheet 56b is arranged between a rear surface 24b of the circuit board 24 and the metal housing 26, and thermally connects both parts to each other. The second heat dissipation sheet 56b is arranged to extend from the rear surface 24b of the circuit board 24 corresponding to a region where a driving IC 50a is arranged to the front end side of the circuit board 24. A region where the circuit board 24 and the metal housing 26 (61) are thermally connected is formed in front of the light receiving/emitting element 52 by the first and second heat dissipation sheets 56a and 56b. By this configuration, the heat from the controlling semiconductor 50 is prevented from flowing into the light receiving/emitting element 52 through the circuit board 24 and transferred to the receiving member 30 (62).

As in the embodiment, when high-speed parallel data transmission is performed by using the plurality of light receiving/emitting elements 52, in order to perform accurate waveform shaping or level controlling, the CDR device 50b may be used. Further, the driving IC 50a of the light receiving/emitting element 52 may also be bigger. As such, when a part having a large amount of heat generation is used as the controlling semiconductor 50, heat generated therefrom flows into the light receiving/emitting element 52, which results in the damage of the light receiving/emitting element 52. In addition, even when the amount of heat generation of an electronic apparatus connected with the electrical connector 22 is large, the same problem may occur.

In the connector assembly 1B, before heat from the controlling semiconductor 50 or the electronic apparatus connected with the electrical connector 22 flows into the light receiving/emitting element 52 through the circuit board 24, the heat may be diffused to the metal housing 26 (61) side to be radiated to the optical cable 3 (3A), and as a result, the heat may be radiated to the optical cable 3 (3A) while preventing the reliability of the light receiving/emitting element 52 from being impaired.

Third Embodiment

Figure 16:
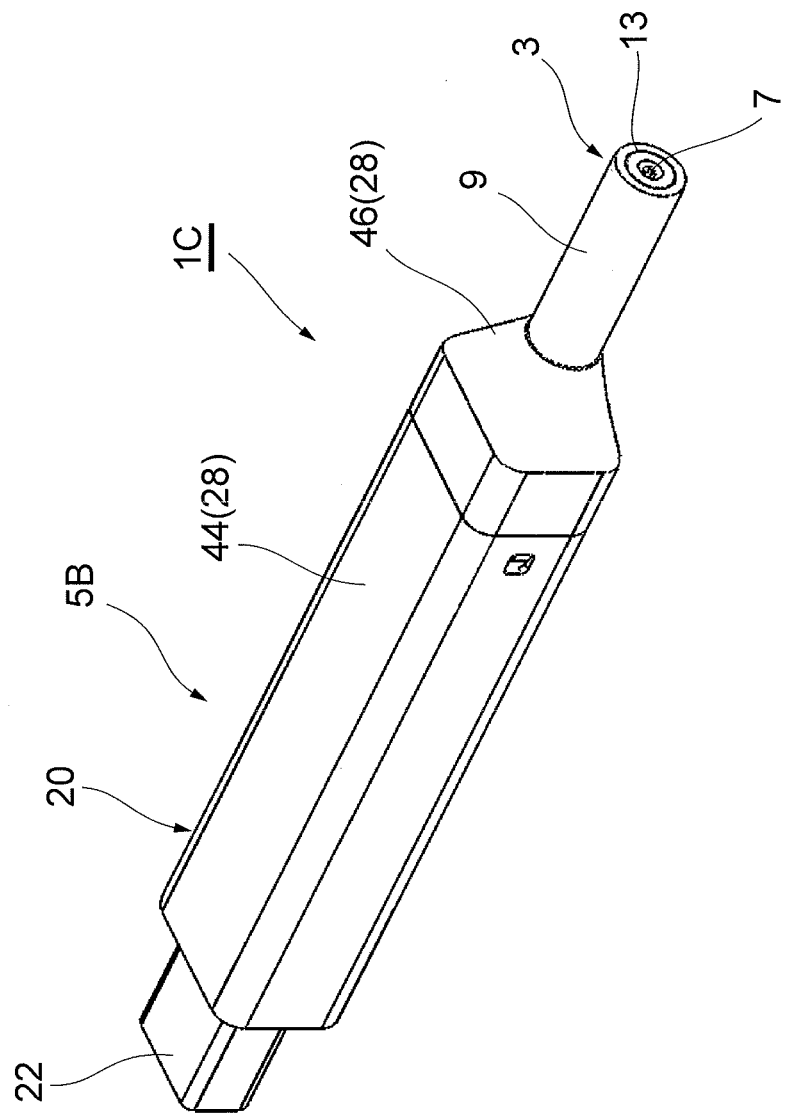
FIG. 16 is a perspective view illustrating a connector assembly according to a third embodiment.
Figure 17:
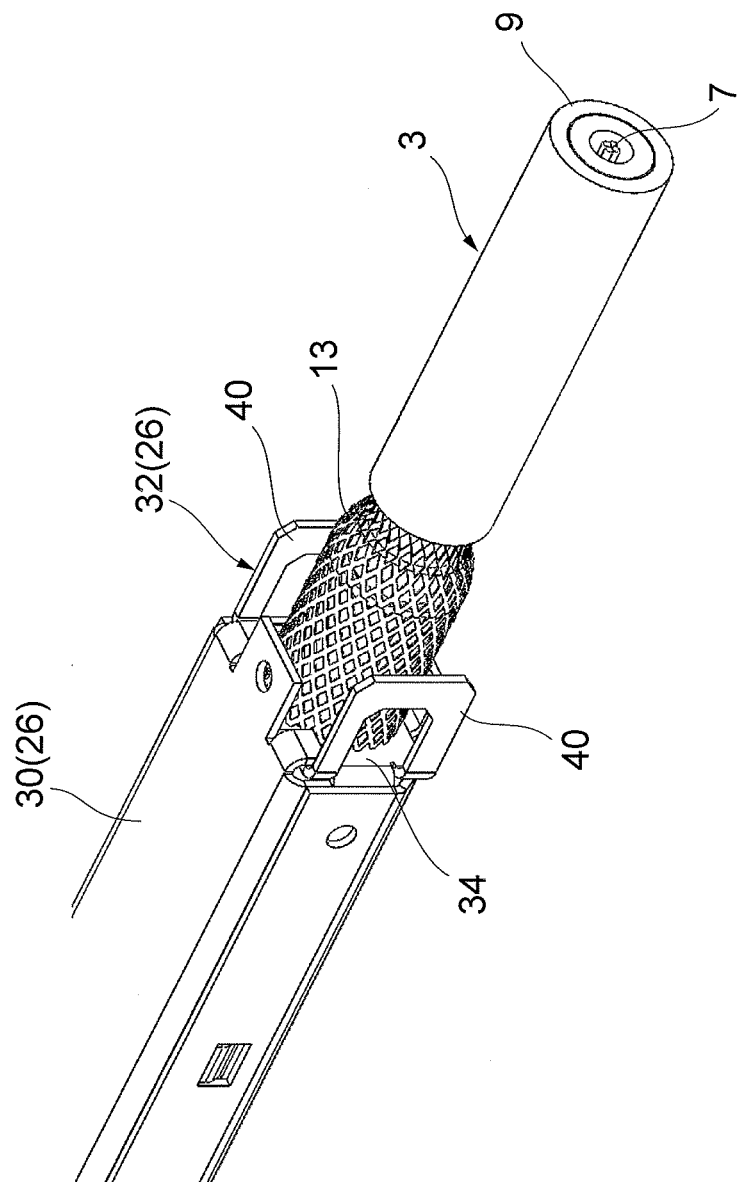
FIG. 17 is a perspective view illustrating a state in which a resin housing is removed.
Figure 18:
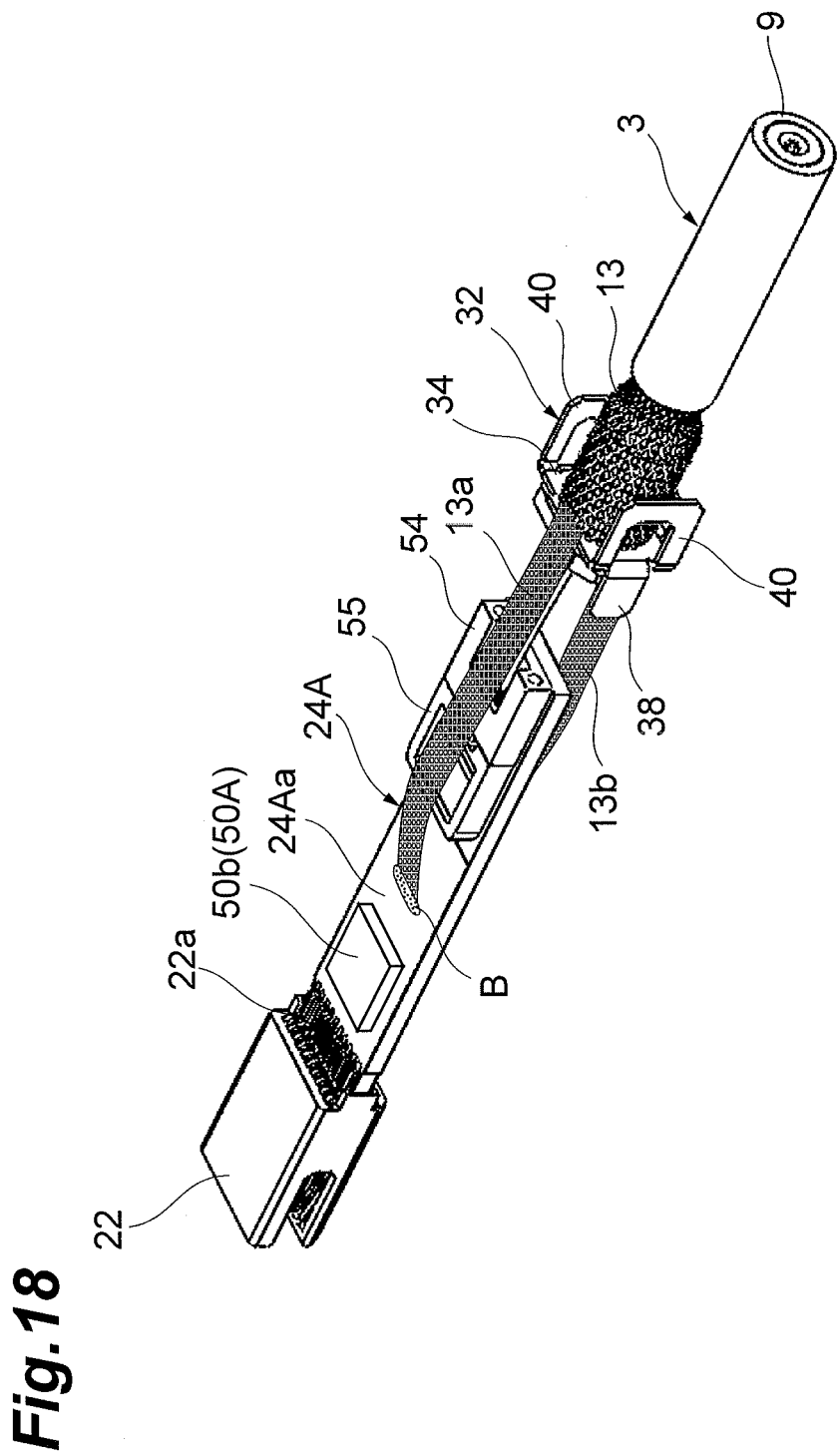
FIG. 18 is a perspective view illustrating a state in which a housing is removed.
Figure 19A:
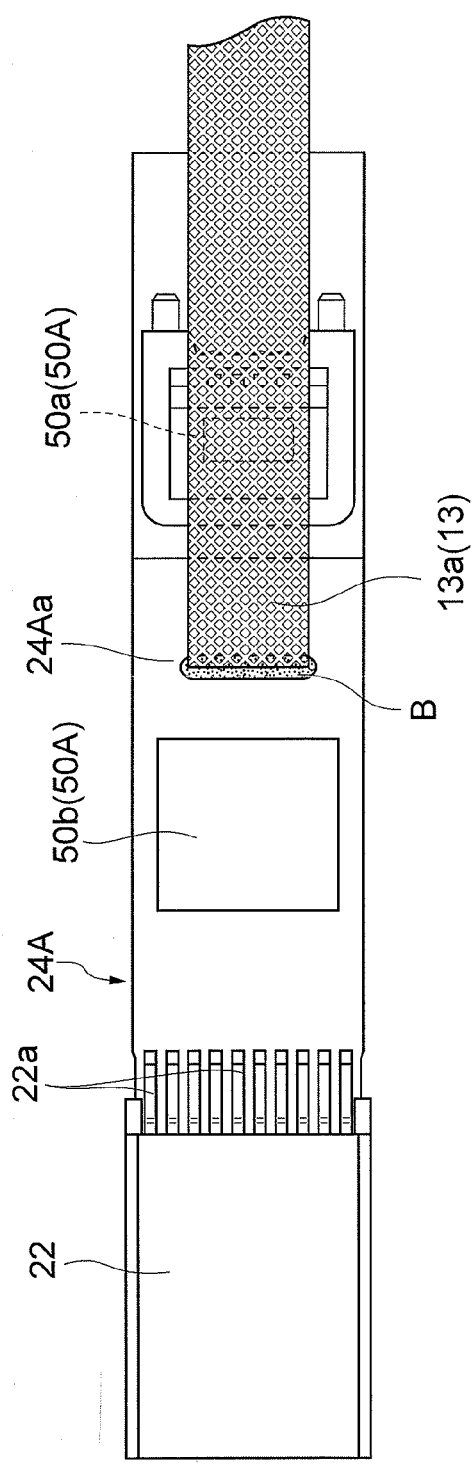
FIG. 19A is a diagram of a circuit board illustrated in FIG. 18 from the surface-side view and FIG. 19B is a diagram of the circuit board illustrated in FIG. 18 from the rear surface-side view.
Figure 19B:
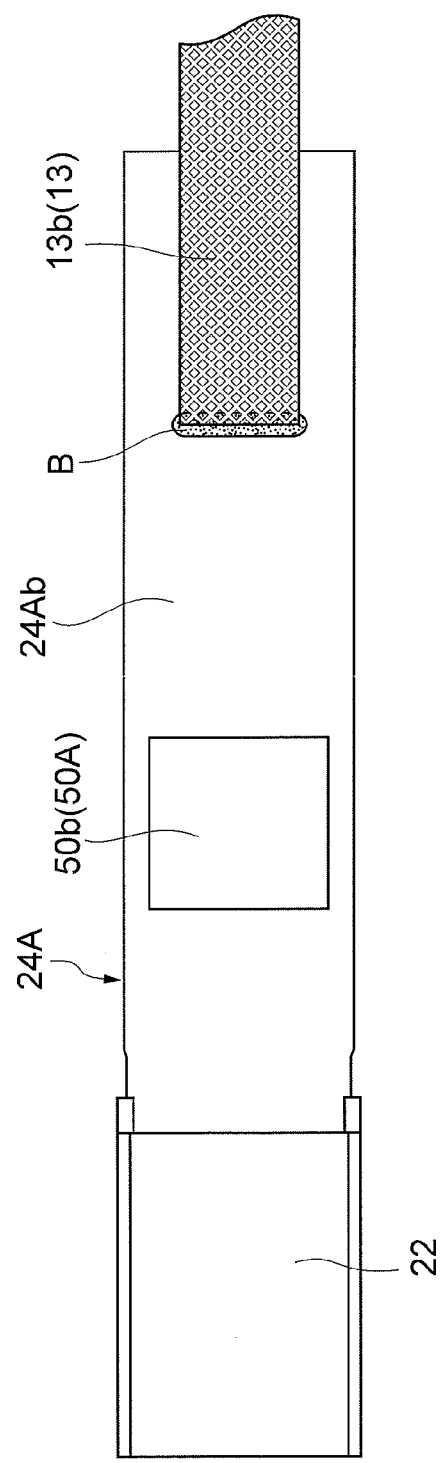
Figure 20:
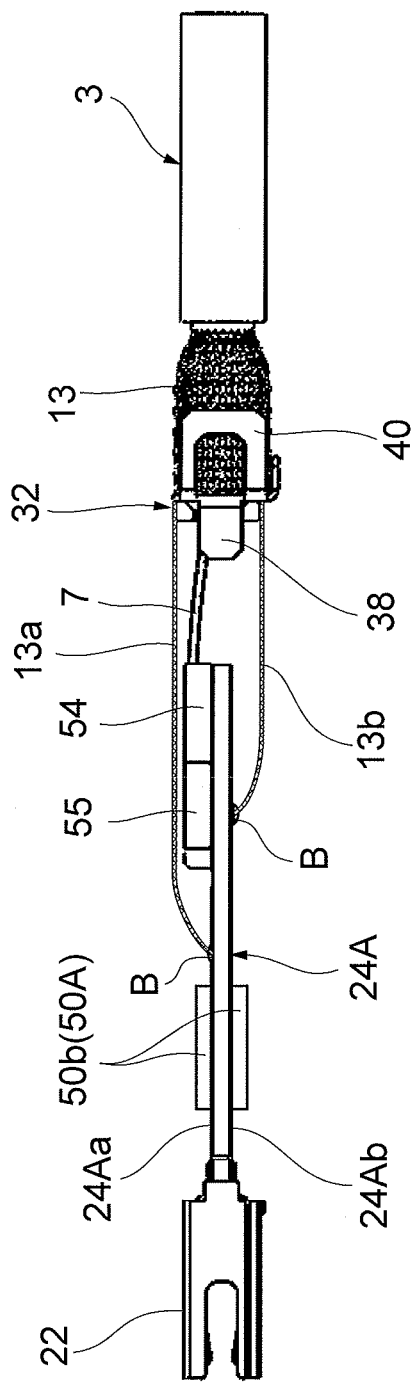
FIG. 20 is a diagram of the circuit board and a fixing member illustrated in FIG. 18 from the side view.
Figure 21:
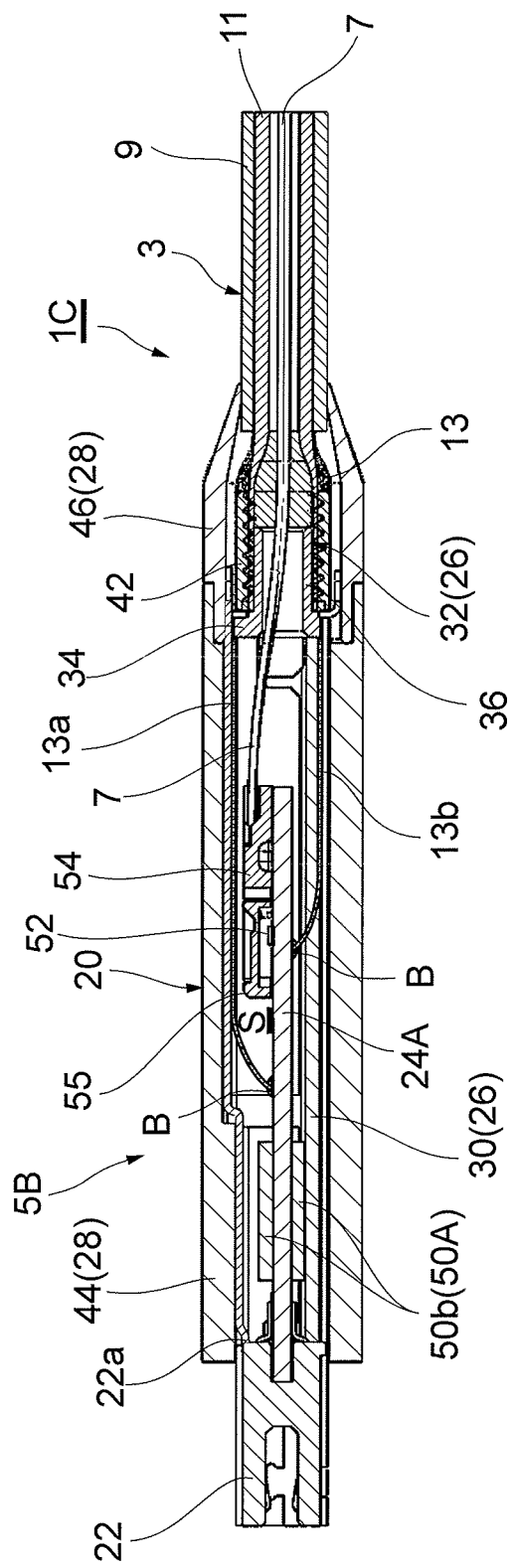
FIG. 21 is a cross-sectional view of the connector assembly illustrated in FIG. 16.
Figure 22:
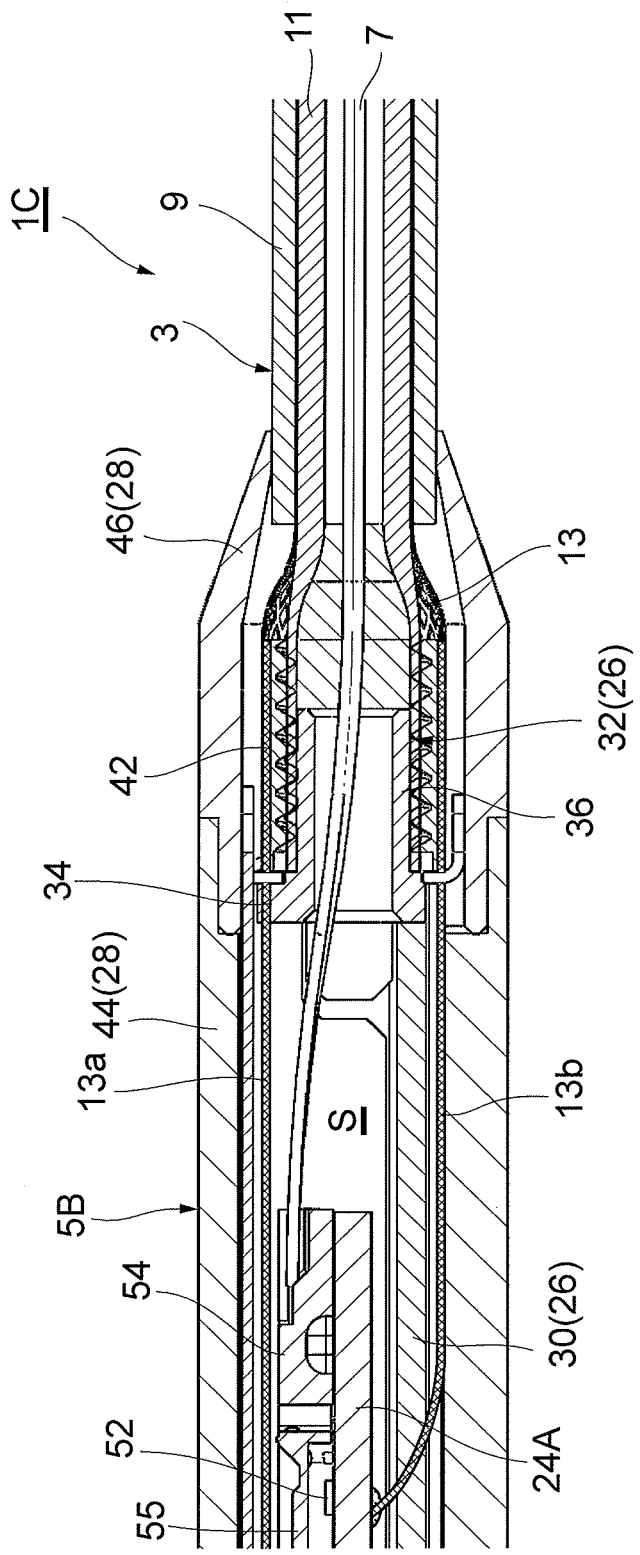
FIG. 22 is a diagram enlarging a part of FIG. 21.

Continuously, a third embodiment will be described. FIG. 16 is a perspective view illustrating a connector assembly according to the third embodiment. FIG. 17 is a perspective view illustrating a state in which a resin housing is removed. FIG. 18 is a perspective view illustrating a state in which a housing is removed. FIG. 19A is a diagram of a circuit board illustrated in FIG. 18 from the surface-side view and FIG. 19A is a diagram of the circuit board illustrated in FIG. 18 from the rear surface-side view. FIG. 20 is a diagram of the circuit board and a fixing member illustrated in FIG. 18 from the side view. FIG. 21 is a cross-sectional view of the connector assembly illustrated in FIG. 16. FIG. 22 is a diagram enlarging a part of FIG. 21.

The connector module 5B includes a housing 20, an electrical connector 22 provided at a front end (leading end) of the housing 20, and a circuit board 24A received in the housing 20. Since the housing 20 and the electrical connector 22 have the same configuration as those described in the first embodiment, a detailed description thereof will be omitted herein.

The circuit board 24A is received in a receiving space S of a metal housing 26 (receiving member 30). A controlling semiconductor 50A and a light receiving/emitting element 52 are mounted on the circuit board 24A. The circuit board 24A electrically connects the controlling semiconductor 50A and the light receiving/emitting element 52 with each other. The circuit board 24A has substantially a rectangular shape from the plan view and has a predetermined thickness. The controlling semiconductor 50A and the light receiving/emitting element 52 configure a photoelectric conversion unit.

The controlling semiconductor 50A includes a driving IC 50a and a plurality of (herein, two) CDR devices 50b which is a waveform shaper. The CDR devices 50b and 50b are arranged on a surface 24Aa and a rear surface 24Ab of the circuit board 24A. The controlling semiconductor 50A is electrically connected with the electrical connector 22.

The light receiving/emitting element 52 is configured to include a light emitting element and a light receiving element (all are not illustrated). The light emitting element and the light receiving element are arranged at a rear end side of the surface 24Aa in the circuit board 24A. The light receiving/emitting element 52 is optically connected with the optical fiber core wire 7 of the optical cable 3 by a connector part 54 and a lens array part 55.

The metallic braid 13 of the optical cable 3 is physically and thermally connected to the circuit board 24A. In detail, the connection will be described with reference to FIGS. 20 and 21. The metallic braid 13 is divided into two upper and lower metallic braids 13a and 13b which have a strip shape in the fixing member 32, and extends up to the circuit board 24A. One metallic braid 13a (FIG. 21) extends between the light receiving/emitting element 52 and the driving IC 50a, and the CDR device 50b, and is joined to the surface 24Aa of the circuit board 24A by soldering B. The other metallic braid 13b (FIG. 21) extends to a lower side of the light receiving/emitting element 52, and is joined to the rear surface 24Ab of the circuit board 24 by soldering. By this configuration, the metallic braid 13 and the circuit board 24A are thermally connected with each other.

The thermal connection described herein means that a heat transferrable route is established by physical connection. Therefore, in the embodiment, transferring heat through a medium such as air, and the like does not mean thermal connection.

Continuously, a heat dissipation method in the connector assembly 1C will be described with reference to FIG. 21. Heat generated from the controlling semiconductor 50A and the light receiving/emitting element 52 mounted on the circuit board 24A is first transferred to the circuit board 24A. The heat transferred to the circuit board 24A is transferred to the metallic braid 13 of the optical cable 3. Further, the heat transferred to the metallic braid 13 is dissipated outside through the outer cover 9 of the optical cable 3. By this configuration, in the connector assembly 1C, the heat generated from the controlling semiconductor 50A and the light receiving/emitting element 52 as the heating elements is dissipated outside.

As described above, in the embodiment, the metallic braid 13 having high thermal conductivity is provided in the optical cable 3, and the metallic braid 13 are physically and thermally connected to the circuit board 24A on which the heating element such as the controlling semiconductor 50A and the light receiving/emitting element 52 is mounted. By this configuration, the heat generated from the controlling semiconductor 50A and the light receiving/emitting element 52 is transferred to the metallic braid 13 of the optical cable 3 through the circuit board 24A and dissipated from the outer cover 9 of the optical cable 3 to the outside. That is, since a heat dissipation route is established between the connector module 5B and the optical cable 3, the heat of the circuit board 24A may be efficiently radiated to the optical cable 3. As a result, since the housing 20 does not have excessive heat, a feel of strangeness to a user may be reduced.

Herein, it is also considered that the heat is dissipated to the connection target such as the PC, and the like through the electrical connector 22. However, it is difficult to predict whether the connection target is able to accept the dissipated heat at the time of dissipating the heat. As a result, when the temperature of the connection target increases at the time of dissipating the heat, the heat of the connector assembly 1C may not be sufficiently radiated to the connection target. In this regard, in the embodiment, since the heat of the circuit board 24A is radiated to the optical cable 3 to be dissipated outside, the heat may be sufficiently dissipated without depending on a state of a connection destination of the connector assembly 1C.

Further, in the embodiment, the metallic braid 13a is joined to the surface 24Aa of the circuit board 24A between the plurality of heat elements (the light receiving/emitting element 52 and the driving IC 50a and the CDR device 50b) by the soldering B. By this configuration, heat generated from the plurality of heating elements is efficiently transferred to the heat transfer member. In addition, in the embodiment, the metallic braid 13b is joined to the rear surface 24Ab of the circuit board 24A of a part on which the heating element (light receiving/emitting element 52) is mounted by soldering. By this configuration, on the same surface as the heating element, when it is difficult to arrange the metallic braid close to the heating element, for example, even when the light receiving/emitting element 52 and the driving IC 50a are enclosed by the lens array part 55, heat from the rear surface 24Ab of the circuit board 24A of the part on which the heating element is mounted is efficiently conducted to the heat transfer member.

Further, in the embodiment, since the metallic braid 13 is divided into two (metallic braids 13a and 13b) in the strip shape, a heat transfer area may be ensured and heat transfer efficiency is improved. In addition, since the metallic braid 13 is joined to the circuit board 24A by the soldering B, the thermal connection may be performed more significantly.

Further, since the metal housing 26 as the thermal conductor is received in the resin housing 28, the heat of the circuit board 24A is radiated to the optical cable 3 having high thermal conductivity. Accordingly, the heat transfer route for radiating heat to the optical cable 3 may be significantly configured. In addition, by using the resin housing 28, when the user touches the housing 20, the user less feels hot (hotness).

Further, the optical cable 3 includes the optical fiber core wire 7, the resin-made outer cover 9 covering the optical fiber core wire 7, the tensile strength fiber 11 interposed between the optical fiber core wire 7 and the outer cover 9, and the metallic braid 13 interposed between the outer cover 9 and the tensile strength fiber 11, and the optical fiber core wire 7, the tensile strength fiber 11, the metallic braid 13, and the outer cover 9 are arranged outward in the diameter direction thereof from the center thereof in this order. By this configuration, the optical cable 3 may secure durability against external force such as tensile force, and the like applied to the optical cable 3 while the tensile strength fiber 11 is provided between the optical fiber core wire 7 and the metallic braid 13, and thus it is possible to prevent dissipation of the generated heat from the heat conductor to the outside through the outer cover 9 from being interfered. In addition, no space is interposed between the outer cover 9 and the metallic braid 13 which are closely attached to each other, thereby efficiently diffusing heat from the metallic braid 13 to the outer cover 9.

Further, in the embodiment, although the metallic braid 13 is exemplified as the heat transfer member, the heat transfer member is not limited to the metallic braid 13. As the heat transfer member, a member having high thermal conductivity may be used and for example, a metallic tape, and the like may be used.

Further, in the embodiment, although the metallic braid 13 is joined to the circuit board 24A by the soldering B, the joining method of the metallic braid 13 to the circuit board 24A is not limited to soldering, and the metallic braid 13 may be clamped to the circuit board 24A. In addition, in this case, when it is assumed that external force may be applied to a joining portion, a joining method in which the joining is not easily released needs to be selected and the joining using soldering is most preferable.

Further, in the embodiment, although the metallic braid 13 is divided into two in the strip shape, the shape of the metallic braid 13 is not limited thereto. For example, the metallic braid 13 may be tied. In this case, in the base portion 34 of the fixing member 32, a notch portion (slit) for passing the tied metallic braid 13 may be formed. In addition, in the embodiment, although the metallic braid 13 is joined to two spots of the surface 24a and the rear surface 24b of the circuit board 24A, a joining position and the number of joining spots of the metallic braid 13 to the circuit board 24A may be appropriately set.

What is claimed is:

1. A connector assembly, comprising:
an optical cable; and
a connector module,
wherein the optical cable includes an optical fiber, an outer cover provided around the optical fiber, and a metallic heat transfer member provided between the optical fiber and the outer cover, and
the connector module includes a housing defining a space, and a circuit board received in the space of the housing and mounted with a photoelectric conversion unit connected with the optical fiber,
the heat transfer member of the optical cable and the circuit board of the connector module are thermally connected to each other by a thermal conductor, and
thermal conductivity of the heat transfer member is higher than that of the thermal conductor.

2. The connector assembly according to claim 1, wherein the heat transfer member is metallic braid.

3. The connector assembly according to claim 1, wherein:
the thermal conductor includes a connection member which is thermally connected to the circuit board and an inner surface of the housing,
the heat transfer member is thermally connected to the housing, and
thermal conductivity of the heat transfer member is higher than that of the connection member.

4. The connector assembly according to claim 1, wherein:
the housing includes a first housing made of a metallic material thermally connected to the heat transfer member and the connection member, and a second housing made of a resin material for receiving the first housing.

5. A connector assembly, comprising:
an optical cable; and
a connector module,
wherein the optical cable includes an optical fiber, an outer cover provided around the optical fiber, and a metallic heat transfer member provided between the optical fiber and the outer cover,
the connector module includes a housing defining a space, and a circuit board received in the space of the housing and mounted with a photoelectric conversion unit connected with the optical fiber,
the heat transfer member of the optical cable and the circuit board of the connector module are thermally connected to each other by a thermal conductor, and
the thermal conductor includes a connection member which is physically and thermally connected to the circuit board and an inner surface of the housing, wherein
the photoelectric conversion unit includes a controlling semiconductor and a light receiving/emitting element,
an electrical connector electrically connected with the circuit board is provided at front end of the housing,
the controlling semiconductor is positioned in front of the light receiving/emitting element and in the rear of the electrical connector on the circuit board, and
the connection member includes a region which is physically and thermally connected to the circuit board in front of the light receiving/emitting element and the inner surface of the housing,
wherein:
the controlling semiconductor includes a clock data recovery (CDR) device, and
the connection member includes a first heat dissipation sheet arranged between the clock data recovery (CDR) device and the inner surface of the housing.

6. A connector assembly, comprising:
an optical cable; and
a connector module,
wherein the optical cable includes an optical fiber, an outer cover provided around the optical fiber, and a metallic heat transfer member provided between the optical fiber and the outer cover,
the connector module includes a housing defining a space, and a circuit board received in the space of the housing and mounted with a photoelectric conversion unit connected with the optical fiber,
the heat transfer member of the optical cable and the circuit board of the connector module are thermally connected to each other by a thermal conductor, and
the thermal conductor includes a connection member which is physically and thermally connected to the circuit board and an inner surface of the housing, wherein
the photoelectric conversion unit includes a controlling semiconductor and a light receiving/emitting element,
an electrical connector electrically connected with the circuit board is provided at front end of the housing,
the controlling semiconductor is positioned in front of the light receiving/emitting element and in the rear of the electrical connector on the circuit board, and
the connection member includes a region which is physically and thermally connected to the circuit board in front of the light receiving/emitting element and the inner surface of the housing,
wherein:
the controlling semiconductor includes a driving IC, and
the connection member includes a second heat dissipation sheet arranged between a rear surface of the circuit board corresponding to a region where a driving IC is arranged and the inner surface of the housing.

7. A connector assembly, comprising:

an optical cable; and a connector module, wherein the optical cable includes an optical fiber, an outer cover provided around the optical fiber, and a metallic heat transfer member provided between the optical fiber and the outer cover, the connector module includes a housing defining a space, and a circuit board received in the space of the housing and mounted with a photoelectric conversion unit connected with the optical fiber, the heat transfer member of the optical cable and the circuit board of the connector module are thermally connected to each other by a thermal conductor, the housing includes a first housing made of a metallic material constituting the thermal conductor, and the housing includes a second housing made of a resin material for receiving the first housing.

8. A connector assembly, comprising:

an optical cable; and a connector module, wherein the optical cable includes an optical fiber, an outer cover provided around the optical fiber, and a metallic heat transfer member provided between the optical fiber and the outer cover, the connector module includes a housing defining a space, and a circuit board received in the space of the housing and mounted with a photoelectric conversion unit connected with the optical fiber, the heat transfer member of the optical cable and the circuit board of the connector module are thermally connected to each other, and the optical cable includes a tensile strength fiber between the optical fiber and the heat transfer member.

9. The connector assembly according to claim 8, wherein the optical cable is provided with a tube between the tensile strength fiber and the heat transfer member.

\* \* \* \* \*